US011700304B2

(12) United States Patent
Brown, Jr. et al.

(10) Patent No.: US 11,700,304 B2
(45) Date of Patent: Jul. 11, 2023

(54) CONFIRMATION OF SERVICE LEVELS VIA DISTRIBUTED LEDGERS

(71) Applicant: Deixis, PBC, Seattle, WA (US)

(72) Inventors: Allen L. Brown, Jr., Lake Oswego, OR (US); Patrick J. D. Santos, Kirkland, WA (US)

(73) Assignee: Deixis, PBC, Seattle, WA (US)

( * ) Notice: Subject to any disclaimer, the term of this patent is extended or adjusted under 35 U.S.C. 154(b) by 0 days.

(21) Appl. No.: 17/529,464

(22) Filed: Nov. 18, 2021

(65) Prior Publication Data

US 2022/0159071 A1 May 19, 2022

Related U.S. Application Data

(60) Provisional application No. 63/116,081, filed on Nov. 19, 2020.

(51) Int. Cl.
*H04L 67/1097* (2022.01)
*G06F 16/27* (2019.01)
*H04L 67/61* (2022.01)

(52) U.S. Cl.
CPC ......... *H04L 67/1097* (2013.01); *G06F 16/27* (2019.01); *H04L 67/61* (2022.05)

(58) Field of Classification Search
CPC ...... H04L 67/1097; H04L 67/61; G06F 16/27
See application file for complete search history.

(56) References Cited

U.S. PATENT DOCUMENTS

| | | | |
|---|---|---|---|
| 2003/0176945 A1* | 9/2003 | Tozuka | B64F 1/368 700/226 |
| 2008/0077652 A1* | 3/2008 | Grant | H04L 41/5003 709/203 |
| 2013/0170451 A1* | 7/2013 | Krause | H04W 92/02 370/329 |
| 2016/0182345 A1* | 6/2016 | Herdrich | H04L 41/5009 709/224 |

(Continued)

OTHER PUBLICATIONS

Alzubaidi et al. A Blockchain-based Approach for Assessing Compliance with SLA-guaranteed IoT Services. arXiv:2006.15314v1. Jun. 27, 2020. pp. 1-8. [retrieved on Mar. 4, 2022]. Retrieved from <URL:https://arxiv.org/?pdf/2006.15314.pdf> Section III; and figure 2.

(Continued)

*Primary Examiner* — Scott B Christensen
(74) *Attorney, Agent, or Firm* — Han Santos, PLLC

(57) ABSTRACT

Techniques to using distributed ledgers to confirm service levels in a network routing are disclosed. Communications networks are virtualized thereby enabling software-defined networking (SDN). An SDN scheduler or allocator makes use of routing techniques where the state of the network is persisted in a form of storage that all nodes are in consensus is accurate. In one example, the SDN scheduler may generate a temporal audit trail of service level agreements (SLAs) over a network path that includes different intermediate autonomous systems from a transmitting node to a destination node. The SDN scheduler may further perform temporal enhancements of the contract, and then combine the temporal enhancements with the temporal audit trail to confirm the actual service level against the service level as prescribed in the contract.

20 Claims, 10 Drawing Sheets

(56) References Cited

U.S. PATENT DOCUMENTS

| | | | |
|---|---|---|---|
| 2021/0390213 A1* | 12/2021 | Thyni | H04L 9/3247 |
| 2022/0014395 A1* | 1/2022 | Milescu | H04L 45/38 |
| 2022/0091903 A1* | 3/2022 | Bai | G06F 11/3433 |
| 2022/0094791 A1* | 3/2022 | Moller | H04L 67/306 |
| 2022/0103453 A1* | 3/2022 | Novotny | H04L 43/50 |
| 2022/0114150 A1* | 4/2022 | Saurabh | G06F 16/214 |

OTHER PUBLICATIONS

Androulaki et al. Hyperledger Fabric: A Distributed Operating System for Permissioned Blockchains. EuroSys '18: Proceedings of the Thirteenth EuroSys Conference. Apr. 23, 2018, pp. 1-15. Sections 3.1, 3.3, 4.5; and figure 2.

De Brito Goncavles et al. A Service Level Agreement Verification System using Blockchains. In: 2020 IEEE 11th International Conference on Software Engineering and Service Science (ICSESS). IEEE. Oct. 16, 2020, pp. 541-544. Section IV; and figure 1.

International Patent Application No. PCT/US2021/060049, International Search Report and Written Opinion dated Mar. 15, 2022, 11 pages.

Scheid et al. Enabling Dynamic SLA Compensation Using Blockchain-based Smart Contracts. 2019 IFIP/IEEE Symposium on Integrated Network and Service Management (IM). Apr. 8, 2019, pp. 53-61. pp. 53-60.

\* cited by examiner

CONFIRMATION OF SERVICE LEVELS VIA DISTRIBUTED LEDGERS

CROSS-REFERENCE TO RELATED PATENT APPLICATIONS

This application claims priority to U.S. Provisional Patent Application No. 63/116,081 filed on Nov. 19, 2020, and entitled "Confirmation of Service Levels Via Distributed Ledgers" which is hereby incorporated by reference in its entirety.

BACKGROUND

Wireless communications are communications that generally utilize radio frequency (RF) rather than physical lines as a transmission medium for endpoints. As with wired communications, wireless communications are between endpoints, defined as terminals that are the consumers of communications, such as smartphones and computers. Intermediate communications between endpoints may be wired; for the definition of wireless communications, only a single terminal in a session needs to be wireless since the inclusion of a single wireless terminal gives rise to the issues around wireless communications.

Wireless communications have several advantages, most notably that of ubiquity. In turn, ubiquity provides several emergent properties. Since endpoints are not tied to a physical location, endpoints may be mobile. In fact, wireless networks need not be static; they may be "adhoc," e.g., endpoints may connect and communicate "just-in-time."

Adding to the dynamic nature of wireless communications, the ad hoc endpoints may also include ad hoc underlying communications fabric. Because the endpoints are mobile, they may roam between different networks. Roaming may be between networks using regulated frequencies such as for cellular networks or may be between licensed and unlicensed networks such as between cellular networks and Wi-Fi networks. To manage spectrum utilization, Mobile Network Operators (MNOs) (in a network slicing implementation) may switch endpoints to different overlaid networks depending on the profile of network use. For example, a user streaming a 4K movie might be allocated a high-bandwidth network, while a user sending a text might be allocated a low-bandwidth network. As different networks may have different owners, even with communications standards, the different owners may not trust each other for auditing, billing, and government/regulatory/compliance (GRC) issues. GRC issues further complicate matters since regulated radio frequencies are not just subject to spectrum allocation regulations, but also compliance with public use laws.

In the present 5G technology, very-high-speed networks with an extremely flexible configuration and service architectures are likely to impact current MNO operations. Presently, MNOs rely on software-defined network (SDN) technology to a degree, for example to perform network slicing (dynamic/elastic allocation of network bandwidth) and mobile/multi-access edge computing (MEC). Generation of models and solutions may improve network allocation optimization and management.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Overview

Preliminary Statement

Figure 1:
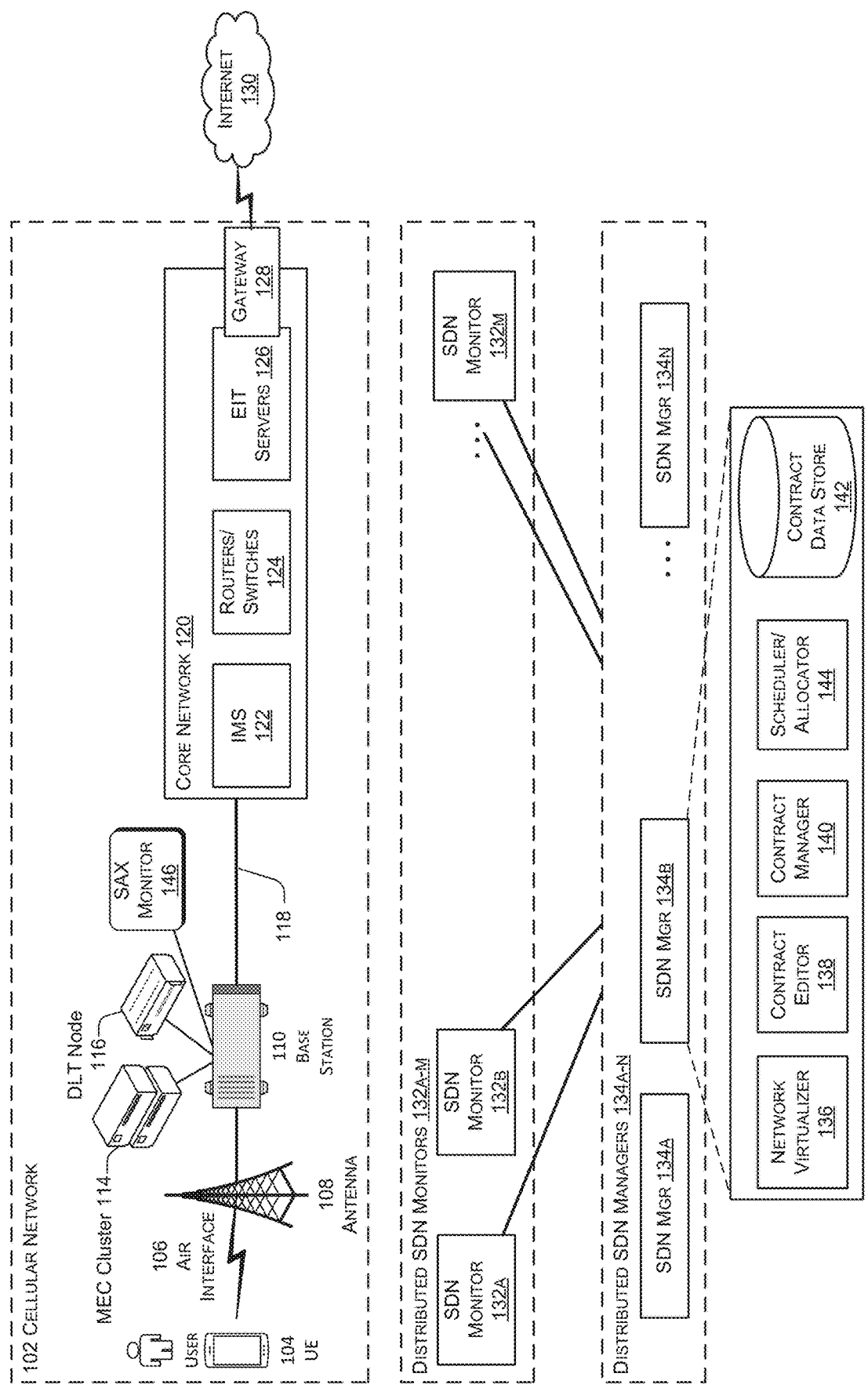
FIG. 1 is a diagram of an example cellular network environment that includes an exemplary SDN to implement a confirmation of service levels via distributed ledgers.

Distributed ledgers may be leveraged to solve the growing impact of 5G technologies and particularly, in the implementation of network slicing and MEC architectures over different network operators or autonomous systems. In one embodiment, 5G supported distributed ledgers may facilitate performance of contracts to orchestrate and choreograph these autonomous systems that may include MNOs and $3^{rd}$ parties offering services that are hosted on the 5G fabric. For example, the use of the distributed ledgers may generate a temporal audit trail of service level agreements (SLAs) for transmitting data packets over autonomous systems and further facilitate the temporal enhancement of these contracts. In this example, the temporal audit trail and the temporal enhancement of contracts may be combined to check a level of service against the level of service as prescribed by the SLAs. The SLAs are contracts between the network providers and customers to transfer/transmit data packets with speed and time requirements. For example, the SLA may include a volume of data packets, minimum Quality of Service (QoS), and a time window for the transmission of the data packets. In this example, the distributed ledgers may timestamp a transaction on its blockchain to track the transitions between the autonomous systems and leave the temporal audit trail.

In one example, the temporal enhancement of the contracts may utilize asynchronous pi-calculus (aPi), symmetric asset exchange, and/or labeled transition systems. In this example, the distributed ledger may provide irrefutable evidence of the contract performance, including the tracking of qualities and quantities by which the service levels may be assessed and enforced. The contracts may be understood to include orchestration of web service engagements which, in turn, produces a choreography of web service instances.

The choreography of web service instances may correspond to symmetric asset exchange contracts.

In one embodiment, the descriptions of the symmetric asset exchanges of a credit card clearance and baggage forwarding may be applied to achieve a consistent view of a network forwarding path and to establish an end-to-end virtual circuit by orchestrating a collection of peers. In some examples, the symmetric asset exchanges of mobile payments may be also applied to a mobile network hosted service and to create a new ecosystem of contract jobbers.

Asynchronous Pi-Calculus

A processor may be designed to directly execute machine code that is based on synchronous or asynchronous pi-calculus. The synchronous or asynchronous pi-calculus may include a mathematical foundation to describe the behavior of a process. In one example, the pi-calculus may be used to effectively model loosely coupled message-passing systems where communication links can be dynamically reorganized. Generally, the synchronous pi-calculus includes a model where a sender node posts a message, the receiver node executes a function, and the sender node gets back the answer to that function. Each of the sender/receiver nodes can be a state machine that interacts with other state machines over a bus or network. Each of the sender/receiver nodes can also be a client and/or server in a traditional web server.

In asynchronous pi-calculus, the sender node may send the message and move on to the next function or process without having to wait for a reply from the receiver node. That is, in a loosely coupled architecture, there is typically no central processor that can control the processing flow via the communication links. A particular processor may send the message to request the performance of a function and then move on to perform whatever it is programmed to do next with or without a reply to the sent message. This feature of the asynchronous pi-calculus may enable the processor to proceed as much as possible independently and concurrently since the processor need not wait for the reply to the sent message. Further, the processor may close the semantic gap between language-level concepts and machine code-level implementations when executing programs written in languages based on the asynchronous pi-calculus.

In one example, the use of the asynchronous pi-calculus and a labeled transition system during the execution of the asynchronous pi-calculus may facilitate temporal enhancement of the contracts to confirm the service levels via the distributed ledger. The labeled transition system may include an automatable structure to capture a protocol workflow of a smart contract. In one example, the labeled transition system may include a directed graph comprised of nodes representing states, and directed edges representing valid transitions between the states. A party progresses through the protocol by transitioning between state to state via the edges. In this example, verified transitions in the labeled transition system may be posted to the distributed ledger.

Contract-Based High-Resolution Network Abstractions

An abstraction that models not only the volume of data packets and the QoS (expressed in terms of speed and bandwidth) of the SLA but also the time-window of availability may support modeling SLA guarantees. Contracts are such an abstraction. Specifically, contracts can cover an arbitrary promise, including temporality. An example of a standard, non-technical legal contract is an employment contract that specifies the time, manner, and place that the employee is to comply with. As applied to networks, the network abstraction model where a primary artifact is a contract specifying at least the volume of data packets to be transmitted over an end-to-end network routing, quality of service guarantees, and availability time windows, would be sufficiently expressive to support SLAs and other similar assertions and promises.

Further enhancement of the contract may include the notion of High-Resolution. Considering a present SLA, an MNO may promise to a customer the bandwidth for the transmission of a particular volume of data packets and the QoS for the entire term of the legal contract comprising the SLA. However, in practice, the customer may have different capacity needs for the transmission of data packets at specific times and locations on a per session basis. A child contract with session scope could be made subject to a global SLA but may either add or may specialize through inheritance the session-specific promises. Taking this concept to another level of detail, hops between intermediate nodes for transmissions in a session can be understood as promises of delivery of a volume of data packets, with a specified QoS, and at a specific time. Accordingly, contracts via addition or specialization through inheritance may include intermediate hop promises. Note that in an alternative implementation, contracts for intermediate hops and/or sessions may be separate contracts containing back-references to the SLA contract or any other contract. In this way, a contract may be considered fine-grained or High-Resolution, that is the contract supports a per-session or potentially a per intermediate-hop degree of specificity.

Emergent Properties of Contract-Based High-Resolution Network Abstractions

In one example, a contract-based High-Resolution network abstraction may provide sufficient fidelity to model for a whole host of other network issues. Accordingly, an SDN with such an abstraction may then manage and optimize around those network issues.

One network issue is around the notion of auditability. Auditability is concomitant with network SLAs—an MNO, for example, should be able to prove to the customer that an SLA was honored. Furthermore, in the example of roaming between cellular networks, and with spectrum sharing (see for example Authorized Shared Access (ASA) and Licensed Shared Access (LSA) telecommunications standards) scenarios, an MNO may be able to prove that promises to other parties were honored as well. Note that the parties to such agreements do not necessarily trust each other. In one embodiment, Distributed Ledger Technology (DLT) may be used in some embodiments to broker trust. The DLT may include a Hyperledger Fabric (HLF) that may timestamp a transaction on its blockchain to track the transitions between the autonomous systems and leave the temporal audit trail. In this embodiment, the temporal audit trail may be combined with the temporal enhancement of the contracts to check the actual level of service for the transmission of data packets versus the level of service that was prescribed by the contract or SLAs.

Symmetric Asset Exchange

In the case of legal contracts, where one party exchanges an asset (such as a good or service) represented by an artifact for another artifact from a second party, substantive breach may be determined by confirming performance or receipt of consideration. With the use of DLT, a party can ensure performance or consideration of the other party prior to the first party's performance or consideration. In this way, the risk of certain classes of damages, such as reliance damages can be virtually eliminated.

With the use of DLT, calculus configuration, and the labeled transition system configuration, protocols can be decomposed into binary exchanges, wherein either both parties receive the other's artifacts, or both do not. There is no attempted exchange where one party receives an artifact and the other does not. Since the results of the exchange are the same for both parties, this exchange is symmetric. Since the exchange is of artifacts representing assets, this (sub) protocol is called symmetric asset exchange (SAX).

A specific decomposition can be of an input component, potentially representing a first process, and an output component, potentially representing a second process. These two components are atomic components that may be composed into larger protocols. In this embodiment, the input component is configured to logically determine either that a message has been received at a first channel and thereafter binds the message to a variable of the first channel, or that the message has been received at a second channel and thereafter binds the message to a variable of the second channel. In turn, the output component is configured to receive a message comprised of two components, and upon receipt of the message, to send the first component on a first channel and to send the second component on a second channel. A composition of the two results in the first process receiving an artifact from the second process and the second process receiving an artifact from the first process, or both processes not receiving an artifact. In this configuration, the input and output components satisfy the symmetric asset exchange.

As described herein, the symmetric asset exchanges for baggage forwarding may be used as a reference for the confirmation of the service level for the transmission of data packets via the distributed ledgers. Similarly, the symmetric asset exchanges for credit card transactions or clearance can be used as a reference for mobile network hosted service.

Example SDN Utilizing a Distributed Ledger to Confirm Service Levels

FIG. 1 is an example of cellular network environment 100 including an exemplary SDN that implements the confirmation of service levels via the distributed ledgers. In one example, a cellular network 102 that is the subject of the SDN may include a mobile terminal 104, known in industry parlance as "user equipment." Example mobile terminals 104 may include a laptop, a personal digital assistant (PDA), a satellite radio, a global positioning system (GPS), IoT devices with a tracking mechanism, a multimedia device, a video device, a camera, and/or other similar functioning devices.

Mobile terminals 104 may connect wirelessly over the Air Interface 106, which may implement the encoding standards for cellular protocols such as LTE and 5G networks. The other terminal of the Air Interface 106 is a cellular antenna 108.

A base station 110 is connected to multiple antennas 108, over fiber optic cables or other physical lines, for example. The base station 110 may implement network slicing to allocate digitized bandwidth to various channels for various respective mobile terminals 104 to transmit volumes of data packets. In one example, these channels may be dynamically allocated and configured at the packet level for the transmission of the data packets.

Base stations 110 may receive data from intermediate cells such as picocells and femtocells (not shown). In some cases, base stations 110 may mediate devices using unlicensed spectrum such as Wi-Fi access points and home routers (not shown).

In the present SDN embodiment, the base stations 110 may include a mobile/multi-access edge compute (MEC) cluster 114 that can provide edge computer/edge cache services for the mobile equipment 104. The SDN embodiment may also include a DLT node 116 to track transactions for auditing purposes and confirm actual service levels of the transmission of data packets against the service levels as prescribed by the SLAs. In some embodiments, the DLT node 116 may include a HLF (not shown) that facilitates generation of the temporal audit trail and the performance of the temporal enhancement of contracts. The HLF may provide shared storage of applications and facilitate timestamping of a transaction on the blockchain to leave the temporal audit trail. A combination of the generated temporal audit train and the performed temporal enhancement of the contract may establish the actual service level versus the service level as prescribed by the contract.

Backhaul 118 may include physical lines from the base station 110 to a Core Network 120. The backhaul 118 is typically comprised of fiber optic lines. Collectively, the antennas 108, base station 110, and the backhaul 118 are known as the Access Network since it acts as a collection "funnel" of communications requests from various geographically disparate mobile equipment 104 to access the Core Network 120.

The Core Network 120 may be where the bulk of the routing is performed. The Core Network 120 may route packets in the cellular network 102, which in turn may eventually find the location of the terminal mobile equipment 104 and forward accordingly. The Core Network 120 may include an IP Multimedia System (IMS) infrastructure 122, which is responsible for validating incoming communications requests from various routers, switches 124 comprising the nodes in intermediate hops, and enterprise information technology (EIT) servers 126. EIT servers 126 may provide the platforms for service functionality. Examples include voice mail and short message service (SMS) functions.

A special EIT server 126 is a gateway 128 that provides access to the Internet 130. Internet services are generally not resident in the Core Network 120 and therefore are mediated by the gateway 128.

In an embodiment, the cellular network 102 may be virtualized in at least two ways. First, many of the functions from the access network (base station 110 and associated infrastructure) to the Core Network 120 may be implemented on containers on virtual machines. Thus, strictly speaking, we may have a "virtual network."

A second way is to allocate resources via software-defined networking (SDN). While not strictly required for SDN, containers create not only elastic cloud capability (allocate and deallocate virtual machines as needed for present capacity) but also are quickly responsive and easy to instrument with software. Accordingly, where a cellular network has been substantively hosted on virtual machine containers, network resources can be sliced and allocated in best-fit situations dynamically.

To implement the SDN, we can parallel analogous infrastructure to the physical cellular network 102 with distributed SDN monitors 132*a-m* and distributed SDN managers 134*a-n*. The layer of SDN monitors 132*a-m* may receive telemetry from the physical cellular network 102. The SDN managers 134*a-m* may then send commands to the physical cellular network 102 to dynamically allocate resources such as network channels to implement the network routing or slicing.

Turning to SDN monitors 132*a-m*, each of the components from the mobile equipment 104 through gateway 128 may have a respective SDN monitor, each of which provides telemetry and access controls to its respective component. In some cases, a component may expose telemetry and access control via a native API. In other cases, a separate SDN monitor may be configured and deployed.

Further, the layer of SDN Manager 134a-n may interpret the telemetry in view of contracts such as the SLAs. For example, the SDN Manager 134a-n itself is comprised of several software components. The SDN Manager 134a-n may be hosted in the Core Network 120 itself, or may be hosted remotely on a server in the cloud, or hosted on a base station 110. The SDN Manager 134a-n may expose its functionality through a web-based interface and therefore can be accessed remotely.

Each of the SDN Manager 134a-n may be comprised of various software utilities including a network virtualizer 136. The network virtualizer 136 receives telemetry from each of the SDN monitors 132a-m and may build a virtual model of the present capacity of the network, down to the intermediate hop level, of the entire network. Accordingly, for each hop or intermediate hop, network capacity associated with at least a time window of availability may be visible. Also, quality of service and data payload type may be specified as well.

In an embodiment, the capacity represented in the network virtualizer 136 may be allocated to contracts. Accordingly, each of the SDN managers 134a-n may further include a software contract editor 138 to create or generate the contracts such as the SLAs, a software contract manager 140 to track contracts and deploy contracts, and a contract data store 142 to persist contracts, metadata of contracts, and contract performance.

Note that the network virtualizer 136 is free to choose any abstraction for modeling the network. Some non-trivial models include homology and co-homology models of network nodes. Beyond homological models, the network virtualizer 136 may not only enable formal mathematical models and abstractions of the network and other related states, but the network virtualizer 136 can also include infrastructure to perform formal mathematical proofs that can add mathematical confidence to both static aspects (e.g. correctness of a smart contract or of a particular network configuration), and dynamic aspects (e.g. showing reachability of available autonomous systems). Mathematical proof infrastructure is readily available via Coq, Isabelle, and other automated proving software. For example, in the case of border gateway protocol (BGP), the University of Washington has a software tool known as "Bagpipe" that performs formal mathematical verification of BGP configurations.

Once a contract is deployed via the software contract manager 140, an SDN scheduler/allocator 144 accesses the network virtualizer 136 to identify candidate paths that are likely to be made use of for a session, and based on temporal data from the intermediate hops, makes a QoS representation to one or more mobile equipment terminals 104. Upon scheduling, the network channel is allocated by the scheduler/allocator 144. In one example, the network scheduler/allocator 144 may provide a corresponding fingerprint for data packets that are transiting the channel, which includes an end-to-end network routing.

Note that many parties and nodes are communicating with each other during routing. In some cases, the tracking is performed by the DLT node 116. However, exchanges may be guaranteed with a transaction monitor via the use of the HLF. In the present embodiment, a DLT enabled form of transactions may be enabled via Symmetric Asset Exchange (SAX) Monitor 146. In SAX, the DLT node 116 may perform the intermediate checks prior to an exchange between two nodes. In this way, the selected standard transactional requirements (atomicity, consistency, isolation, and durability) may be enforced. In one embodiment, the DLT node 116 may also provide irrefutable evidence of the contract performance over the sliced network resources, including the tracking of qualities and quantities by which the service levels may be assessed and enforced. In this embodiment, the temporal enhancement of contracts and the use of temporal audit trail may establish the tracking of the qualities and quantities of the service levels.

Consensus and Contracts as a Service (C2aaS)

In one embodiment, the net effect of placing the DLT node 116 on the network edge (e.g., at base station 110) in concert with SDN is to create a consensus validation to arrive at a global, consistent view of network routing. The key effect of the consensus is that because the state is trusted, all stakeholders in the accuracy of the state may proceed in reliance on the state reported by the DLT node 116.

The state reported by the DLT node 116 may include the state of the network and the state of the data transported by the network as provided by the SDN monitors 132a-m. Stakeholders and third parties may also opt to share additional states such as payment fulfillment, other fulfillment, and external state. Commands to change the state of the network may be implemented via the SDN managers 134a-n, which themselves are distributed.

Since the DLT node 116 may create consensus to determine the performance of parties (and of the network), it creates the basis to create the contracts. Accordingly, this infrastructure creates the basis for "Consensus and Contracts as a Service" (C2aaS). In C2aaS, we can place the DLT nodes 116 on each cellular network node, such as the base station 110. The DLT node 116 may be interfaced with a DLT enabled transaction monitor—SAX monitor 146. The DLT node 116 may be also interfaced with the base station 110 itself, the associated SDN monitors 132a-m and associated SDN managers 134a-n.

The SDN managers 134a-n may deploy a smart contract to the DLT nodes 116 (not just at the base station but all DLT nodes 116 that are in consensus under the DLT protocol). The network virtualizer 136 of the SDN manager 134 may select an arbitrary level of abstraction via the use, for example, of operadic techniques. Accordingly, a smart contract may be defined at an arbitrary level of abstraction.

Upon deployment of the smart contract, the SDN monitors 134a-m may report the network state. A third-party oracle may determine if and when to offer to post the network state to the DLT node 116. The SAX monitor 146 may then collect the posted network state offers and determine which pairs or sets of post network state offers are exchange conditions for each other. Upon determining the satisfaction of the exchange conditions, the SAX monitor 146 posts the network state to the DLT node 116. In this way, the consensus from the DLT node 116 provides consensus on the network which in turn enables symmetric exchange conditions. Because the network is virtualized, the network state need not be of a physical router or switch or base station, but rather of a network resource allocation as created by the SDN manager 134.

Consensus Driver Routing

In the preceding use case, the state to achieve consensus was around the macroscopic state of the network for external stakeholders. However, many routing protocols privilege responsiveness over consistency. The result is the risk of creating loops and black holes in routing.

However, there are protocols that rely on knowing the actual present state of the network and making the network routing decisions accordingly. Such protocols would be enabled via the DLT node 116 that can keep track of the state of the network routing nodes.

A common scenario is routing via Border Gateway Protocol (BGP) between the autonomous systems, i.e., networking beacons for a standalone network. The autonomous systems have to track network state sufficient to determine "reachability." Specifically, the autonomous systems mediate requests to transfer data between their constituent respective networks. Each of the autonomous systems has a unique identifier known as an autonomous system number (ASN). An autonomous system such as a particular MNO may generally manage a list of ASNs that can reach the MNO and a list of ASNs that the MNO can reach. These lists can be used to generate potential routing paths that are understood by all nodes as valid paths. These paths, which we can call "consensus paths", may be reported via the DLT node 116. One technique is to report ports via a tri-data structure. Alternatively, other prefix-based techniques such as Burrows-Wheeler graphs may be used as well. In this way, rapid access of state may be achieved.

A side effect of having consensus on state is that mathematical formal methods may be applied to the DLT reported state. As previously mentioned with respect to the network virtualizer 136, this includes the application of proving assertions via Coq and/Isabelle, and in general in making static and dynamic assertion checkers via automated proofs.

In this way, where the DLT node 116 reports consensus paths, consensus-based routing protocols may be deployed, thereby eliminating black holes, routing loops, and other pathologies from optimistic routing protocols. This enhancement of the contract may be combined with the temporal audit trail to confirm the actual service level versus the service level as prescribed in the contract.

Choosing the Distributed Ledger

In one embodiment, the Hyperledger Fabric (HLF) may be used in the distributed ledger platform upon which the asset exchange contracts may be performed. In this embodiment, the HLF may include parties to the contracts that are known to one another as "business partners" and likely have been jointly and severally subjected to a variety of social vetting processes. The HLF may include a permissioned blockchain network that gets set by organizations that intend to set up a consortium. The HLF may support a permissioned network but not a permissionless one.

In one example, the HLF may include three kinds of parties or agents: clients, peers, and orderers. Clients may be understood as the parties to contracts and, in their roles as contract performers, formulate transaction proposals to update the distributed state. Peers may be understood as the agents charged with arriving at a consensus as to which proposed transactions to validate. Orderers episodically turn a fresh batch of endorsed, proposed transactions into a ledger block wherein the proposed transactions may be totally ordered. A subset of the peers may be treated as "endorsing" peers. Endorsing peers are tasked with considering whether clients' proposed transactions are consistent with the contracts to which they are parties. Should a proposed transaction not be accepted by the relevant endorsing peers, the proposal never makes it to the stage of being ordered. Once the peers arrive at a consensus on which ordered, the proposed transactions are valid, and these transactions may be marked as such on the distributed ledger. Transactions are to be understood as updating the values of key/value store, a copy of which is kept by each endorsing peer. Post validation, the local copies of the store are made consistent with the newly validated transactions on the ledger. While the HLF design obliges each endorsing peer to maintain a copy of the key/value store, the peer is, in fact, free to store almost anything it likes. That is because the peer's "chain code" is what passes for a native "smart contract" in the HLF. While a primary use of endorsing peers may be to chronicle the performance of asset exchange contracts, endorsing peers may also maintain other ancillary data of interest to asset exchange contract performance.

Functionally, the HLF may provide shared storage for applications. The access model may be that of a database (which Fabric terms the "world state"), consisting of versioned pairs (which HLF terms "states") of keys and values. For all intents and purposes, a version may be understood as a natural number. Versioned key/value pairs are subject to the temporal constraints that if there is any value at all for a key, there is now or was at some time a version 0 and if there is now a non-zero version n for a key, then there is now or was at some time a version n−1 for that key. Separate from the database, the HLF may maintain another data structure, a blockchain.

The blockchain may be understood as an interleaving of sequences of transactions into a single sequence which is, in turn, partitioned into a sequence of blocks. The original sequences that are interleaved may include proposed update transactions each of which is to be applied to a single key. Each block on the blockchain entailed an update to the world state wherein each valid update transaction on a given key resulted in a new (incremented from the previous) versioned key/value pair for that key. The mapping process which takes a transaction on the blockchain block to a versioned key/value pair is, therefore, a partial function in that the transaction may be deemed invalid.

The native HLF model of a transaction is a collection of "get" (with respect to keys) operations and a collection of "set" (with respect to keys) operations each of which depends on the fixedness of the values of some set of keys. HLF transactions may be understood as being proposed, simulated, endorsed, deemed policy compliant, assembled for ordering, validated for commitment to the ledger, executed on the ledger, and confirmed as executed.

In one embodiment, the transaction flow in the HLF may be organized into three phases: proposing; ordering and packaging; and validating and committing. In the following discussions, these phases will be described from a peer-centric perspective, the reason being that the main task as implementors of HLF chain code is to construct an endorsing peer based on asset exchange contract performance and on certain consistency criteria with respect network routing. Further, the HLF's documented (on the ledger) consensus validation may be used as a basis for contract governance. The brunt of that validation work happens among the peers. As the basis for our exposition is transaction flow, the flow may be understood as a series of mappings.

Figure 2:
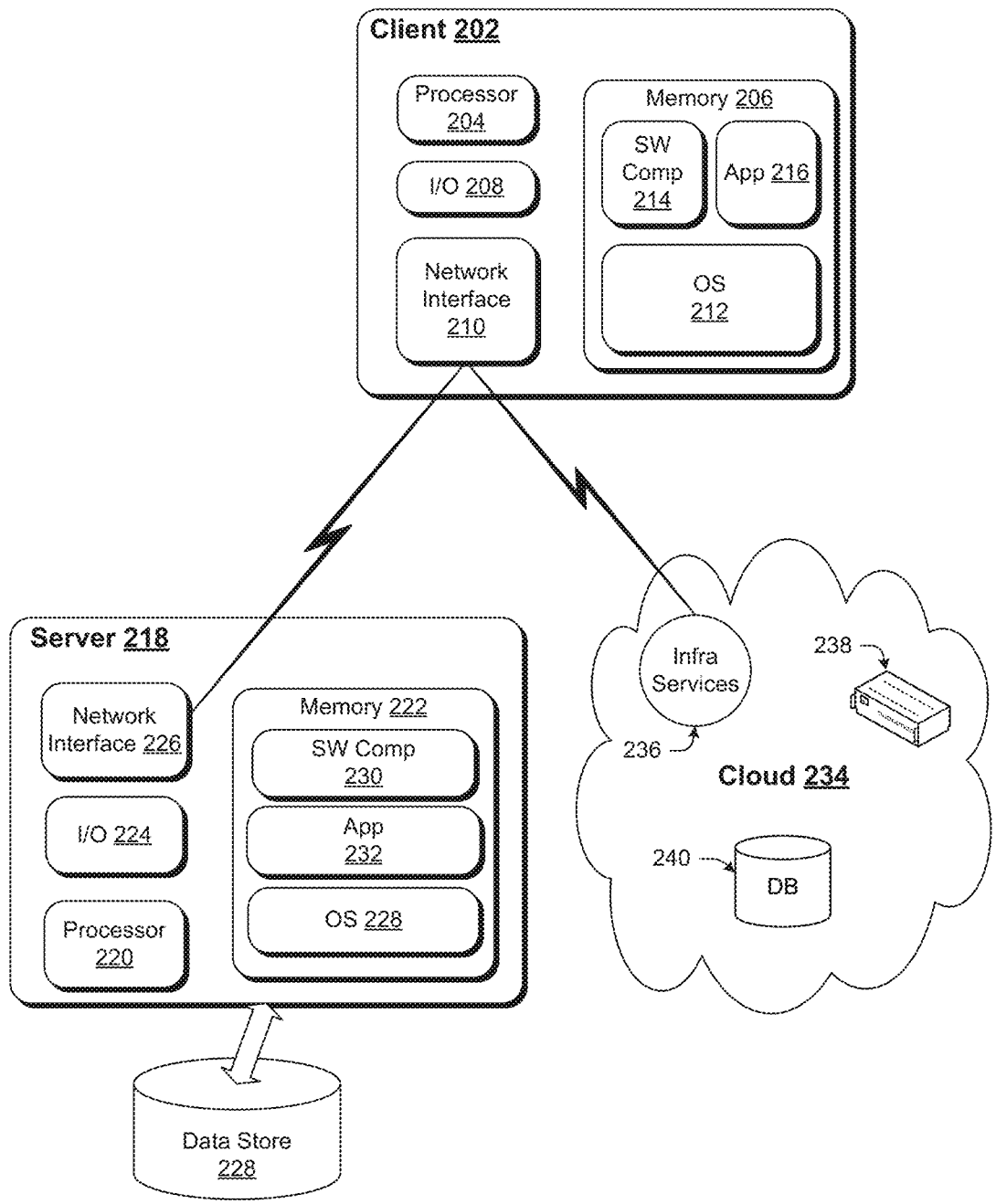
FIG. 2 is a diagram of an example scenario that illustrates a block diagram of a network environment for the SDN that implements the confirmation of service levels via the distributed ledgers.

Example Environment for SDN that Used a Distributed Ledger to Confirm Service Levels FIG. 2 is a block diagram 200 of a network environment for the SDN that implements the confirmation of service levels via the distributed ledgers. The functionality for SDN is generally hosted on computing devices. Exemplary computing devices may include without limitation on the client-side: mobile devices (including smartphones), tablet computers, laptops, desktop personal computers, and kiosks.

Exemplary computing devices on the server side may include without limitation: mainframes, physical servers, and virtual machines. Generally, the computing devices are to be networked.

A client-side computing device (or "client") 202 may have a processor 204 and a memory 206. The processor 204 may be a central processing unit, a repurposed graphical processing unit, and/or a dedicated controller such as a microcontroller. The computing device may further include an input/output (I/O) interface 208, and/or a network interface 210. The I/O interface 208 may be any controller card, such as a universal asynchronous receiver/transmitter (UART) used in conjunction with a standard I/O interface protocol such as RS-232 and/or Universal Serial Bus (USB). The network interface 210, may potentially work in concert with the I/O interface 208 and can be a network interface card supporting Ethernet and/or Wi-Fi and/or any number of other physical and/or data link protocols. Alternatively, network interface 210 may be an interface to a cellular radio.

Memory 206 is any computer-readable media that may store several software components including an operating system 212 and software components 214 and/or other applications 216 including an internet browser or application integrating internet browsing capability. In general, a software component is a set of computer-executable instructions stored together as a discrete whole. Operating systems 212 and applications 216 are themselves software components or integrated aggregations of software components. Examples of software components 214 include binary executables such as static libraries, dynamically linked libraries, and executable programs. Other examples of software components 214 include interpreted executables that are executed on a run time such as servlets, applets, p-Code binaries, and Java binaries. Software components 214 may run in kernel mode and/or user mode.

Computer-readable media includes, at least, two types of computer-readable media, namely computer storage media and communications media. Computer storage media includes volatile and non-volatile, removable, and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), Blu-Ray, or other optical storage, magnetic cassettes, magnetic tape, magnetic disk storage, or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. As defined herein, computer storage media does not include communication media.

The server-side computing device (or "server 218") is any computing device that may participate in a network. The network may be, without limitation, a local area network ("LAN"), a virtual private network ("VPN"), a cellular network, or the Internet. The server 218 has hardware components analogous to the client-side computing device 202. Specifically, the server 218 may include a processor 220, a memory 222, an input/output interface 224, and/or a network interface 226. The memory 222 may include an operating system 228, software components 230, and applications 232. Server hardware 218 differs from client hardware 202 in that processing power is generally more powerful to handle concurrent processes running and network capacity is greater to communicate with multiple clients 202. Server-side software components 230 may include libraries and run-times (e.g., to run interpreted code). Server-side applications 232 may include not only web servers (also called "application servers") and database servers, but also server software providing functionality. Example server software may include transaction monitors, symmetric access exchange monitors, and machine learning/cognitive network analytics services.

In general, server functionality can be implemented as a software service on a physical server 218. However, such a software service may also be hosted on a cloud 234 via a cloud service 236. Specifically, the cloud service 236 is comprised of multiple physical computer servers which are disaggregated via a hypervisor. Each of the physical computer servers may have one or more processors, memory, at least I/O interface and/or network interface. The features and variations of the processors, memory, the I/O interface, and the network interface are substantially similar to those described for the physical computer server 218 described above.

A cloud service 236 includes a hypervisor that can delegate calls to any portion of hardware in the underlying physical servers, and upon request generates a virtual machine from the separate portions of hardware, regardless of a physical server (a process called "disaggregation"). Just as a physical server 218, a virtual machine may host not only software applications, components including services, but also virtual web servers 238 functionality and virtual storage/database 240 functionality.

Note that virtual machines themselves may be further partitioned into containers, which enable the execution of a program in an independent subset of the virtual machine. Software such as Kubernetes, Mesos, and Docker are examples of container management software. Unlike virtual machines which have a delay in startup due to the need for provisioning an entire OS, containers may be generated more quickly and on-demand since the underlying virtual machine is already provisioned.

In one example, the cloud service 234 embodies an abstraction of services. Common examples include service abstractions such as Platform as a Service ("PAAS"), Infrastructure as a Service ("IAAS"), and Software as a Service ("SAAS").

Figure 3:
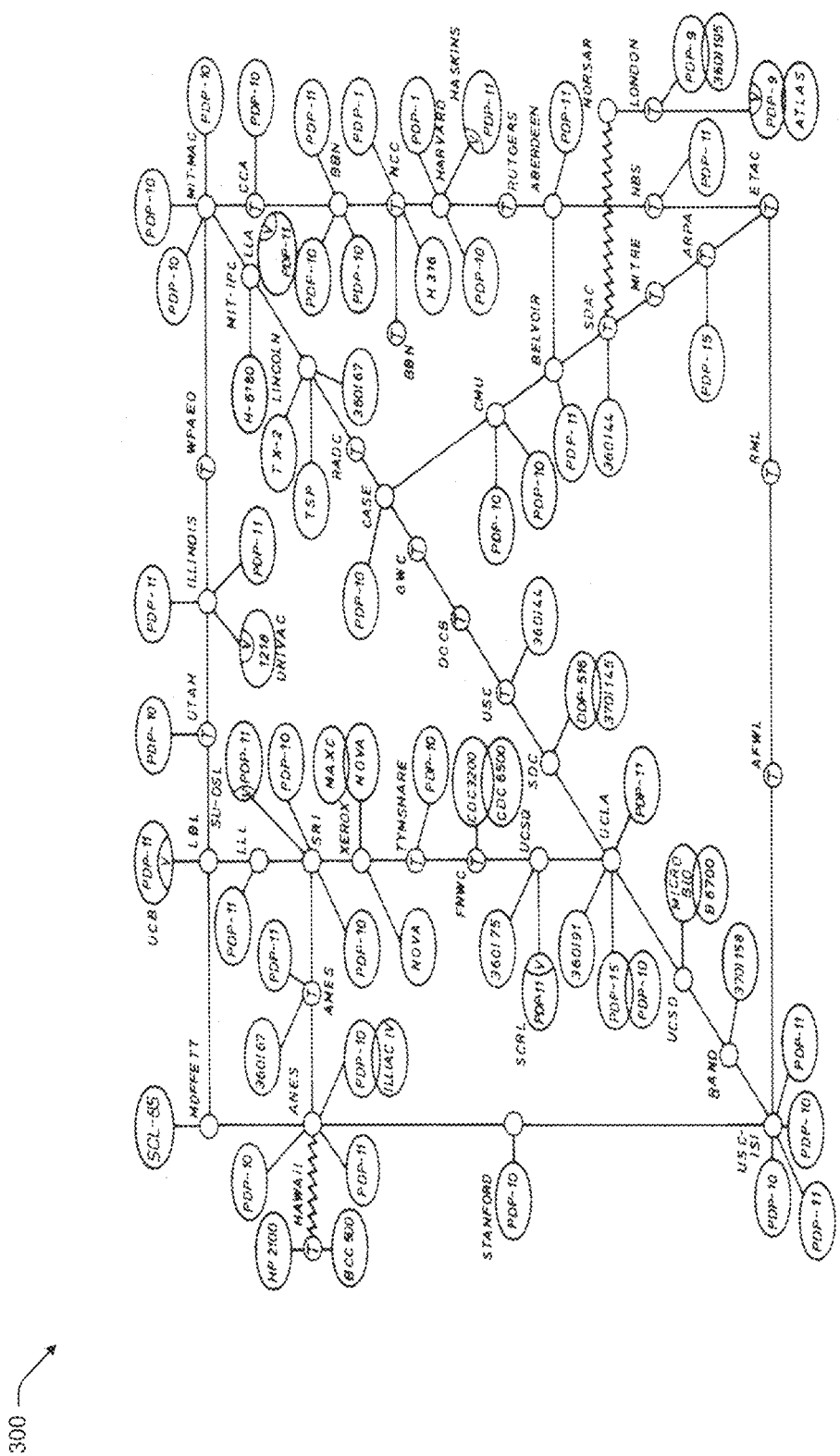
FIG. 3 is an example topology diagram of an Advanced Research Projects Agency Network (ARPANET) that includes a first wide-area packet-switching network service with distributed control.

Confirmation of Actual Service Levels Via
Verifiable and Auditable Contracts on Distributed
Ledgers Example Services FIG. 3 is an example topology of an Advanced Research Projects Agency Network (ARPANET) 300 that includes the first wide-area packet-switching network service with distributed control. The ARPANET 300 is one of the first networks to implement the TCP/IP protocol suite. Different versions of the specification of the ARPANET 300 have been completed since its establishment by the ARPA of United States Department of Defense in 1960s. At present 5G technologies, high-speed wireless connectivity with an extremely flexible configuration and service architecture is likely to have the same impact over the next 50 years than the ARPANET had over the previous 50 years. Two aspects of the 5G architecture by themselves have the potential to deliver such an impact. One of these two aspects is network slicing.

The prospects of network slicing, i.e., executing multiple logical mobile network instances on a shared infrastructure, may require a continuous reconciliation of customer-centric SLAs with infrastructure-level network performance capabilities. Service customers, e.g., from the vertical industries, may request the creation of (tele)communication services by providing "customer-facing" on-demand service requirement descriptions to Service Providers. Operators may execute such mapping in a manual manner on a limited number of service/slice types (mainly mobile broadband, voice, and SMS). With an increased number of such customer requests, an end-to-end (E2E) framework for Service Creations and Service Operations may exhibit a significantly increased level of automation for the lifecycle management of network slice instances.

Another impact of the 5G architecture is multiple-access edge computing. In one example, Mobile-edge Computing such as the MEC cluster 114 of FIG. 1, may provide IT and cloud-computing capabilities within the Radio Access Network (RAN) in close proximity to the mobile subscribers such as the mobile equipment 104. For application developers and content providers, the RAN edge offers a service environment with ultra-low latency and high bandwidth as well as direct access to real-time radio network information (such as subscriber location, cell load, etc.) that can be used by applications and services to offer context-related services. These services are capable of differentiating the mobile broadband experience.

The two impacts above jointly proclaim that services are just about anything for which a vendor might plausibly collect revenue. Moreover, because the services themselves are supported on the edge of the network, they may be confined to a small volume of space—within a building, say. Because the consumer of the service is mobile, the time interval during which the consumer is within the designated space may be quite limited. Insofar as the SLA is specified as being in effect within the confines of a volume of space and an interval of time, those confines are potentially very small. One can project complete automation of SLA generation; else, the sales opportunity will have come and gone while waiting for a geologically-paced human decision. A complementary construct to the automation of SLA creation is a service level proof (SLP). An SLP can be irrefutable evidence that the service promised was actually delivered. In one embodiment, the aforementioned SLAs and SLPs may be materialized or implemented in ecology of verifiable, auditable contracts whose performance can be traced on the distributed ledger technology.

Example Toy Symmetric Asset Exchange Contract (Alice, Carol, and Ted)

Traditional legal contracts entail an exchange of "consideration." As described in implementations herein, the "consideration" may be understood to be an asset of some sort. Having adopted such a perspective, we may understand digital payment systems and digital logistics tracking systems, for example, to be performing digital asset exchange contracts involving specifically characteristic patterns of exchange.

In one example, a digital asset exchange contract definition may include a collection of processes given in a suitably chosen process calculus—specifically, the asynchronous r-calculus with joint inputs. The aforementioned calculus also may have a restricted version—built around symmetric asset exchange (SAX), an internally definable process pattern caramelized in a bit of syntactic sugar—with which we can equip a categorical semantics suitable for interpreting process dynamics in a (categorical) relational database. In so restricting, we may give up the Turing completeness of the larger process calculus. This loss of expressive power may have no practical impact on the modeling of actual commercial contracts as digital constructs, especially as they are given just-in-time embodiments on distributed digital ledgers with faithful reflections in relational databases. It may also be the case that these restricted contracts are verifiable via model checking.

Figure 4:
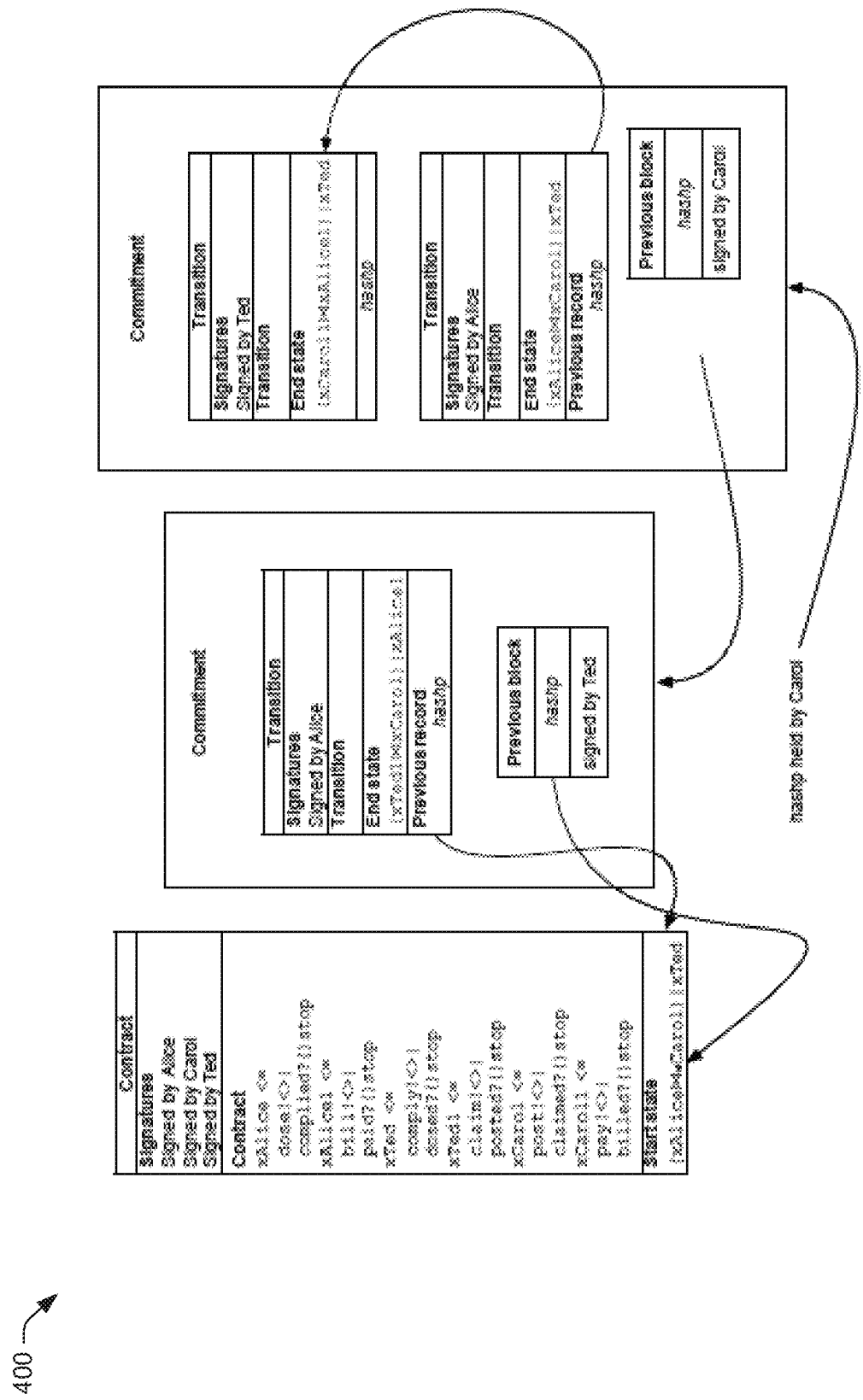
FIGS. 4-6 illustrate an example implementation of formalization of a contract and symmetric asset exchanges among parties to the contract.
Figure 5:
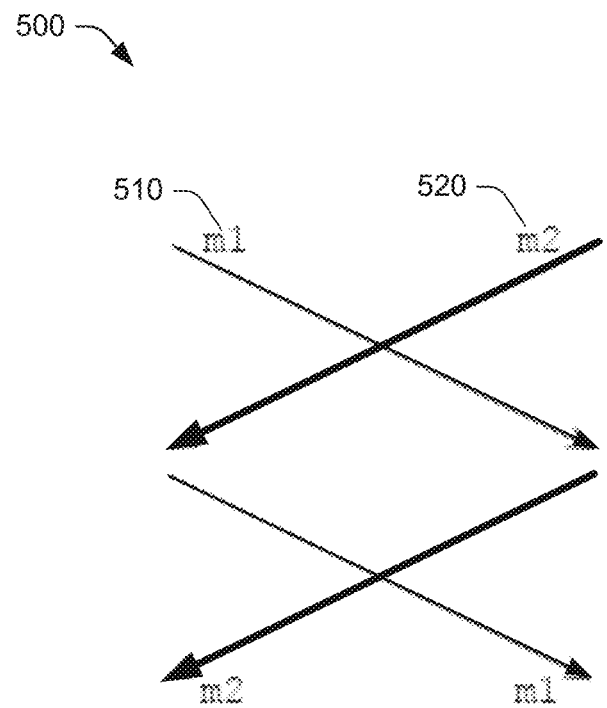
Figure 6:
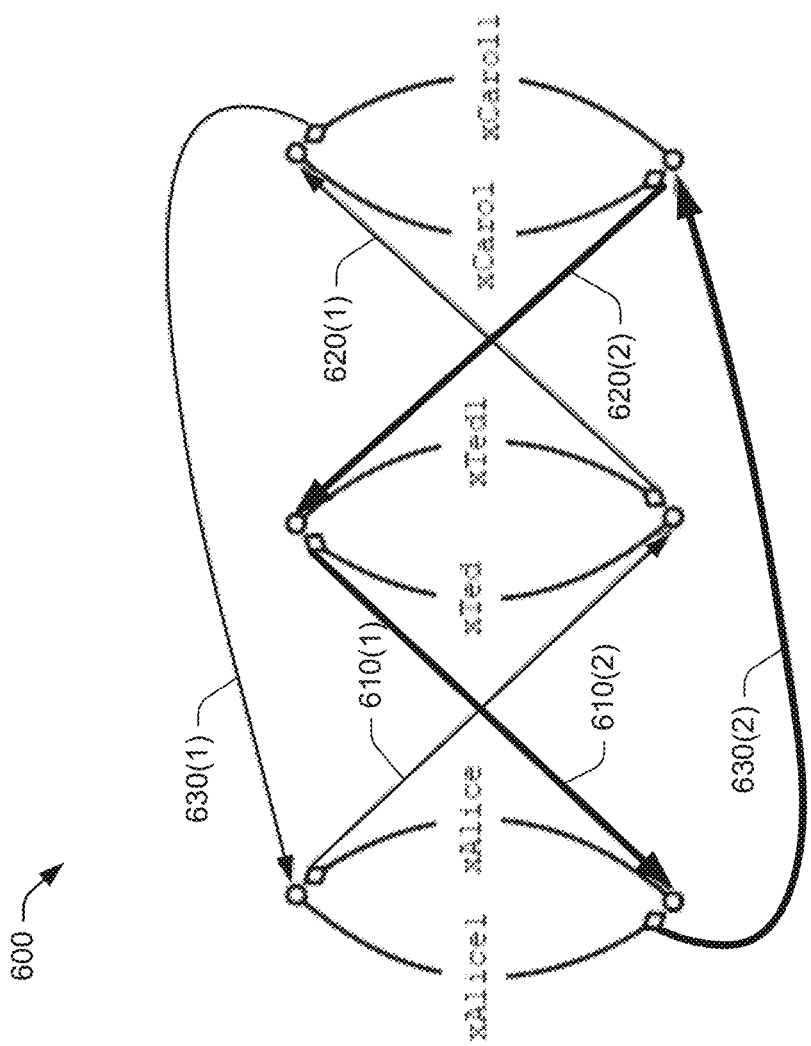

FIGS. 4-6 illustrate a formalization of a contract and symmetric asset exchanges among parties. In one example, FIG. 4 illustrates a sequence 400 encoded on a blockchain. Sequence 400 illustrates initial transitions chronicled on a ledger. Described below is an example toy symmetric asset exchange contract between Alice, Carol, and Ted as parties to the contract. For example, Alice is a health care provider, Ted is a patient, and Carol is a payer. Example terms of the contract are Alice and Ted exchanging a single dose of treatment for an acknowledgment of compliance with treatment; Ted and Carol exchanging a claim of treatment for an acknowledgment of posting of the claim, and Carol and Alice exchanging payment for a bill followed by repeating.

Following the example above, an example formalization of the clauses of their contract may consist of:

```
xAlice(dose,rx,rcv) <=
    dose!<rx> | rcv?(rxcredit)
xAlice1xAlice1(bill,payin,rxcredit) <= bill
    !<rxcredit> | payin?(cash)xAlice
xCarol(payout,demand,fee)
    <=payout ! <fee > |
    demand?(chit)xCarol xTed
    ( treated , rxpay , comply
    ) <=treated ! < rxpay > |
    comply ?( meds ) xTed
```

The complete contract is a composition of session sequences with cascades of contract clauses include:

```
(xAlice(dose,complied)⋈ xAlice1(bill,paid))* |(xTed
    (comply,dosed) ⋈ xTed1(claim,posted))*|
      (xCarol(post,claimed) ⋈ xCarol(pay,billed))* |
((dose,comply ) ⋈ ( complied,dosed)⋈
    (claim,post) ⋈(
    posted,claimed) ⋈
      (pay,bill) ⋈(billed,paid))*
```

The operational semantics for our contract language gives rise to the labeled transition system for Alice, Carol, and Ted, some of whose initial transitions are presented in the following sequence:

```
(xAlice ⋈ xTed ) | xCarol →
    (xTed1 ⋈ x Carol ) | xAlice1 →
      (xCarol1 ⋈ x Alice1 ) | xTed →
        (xAlice ⋈ xTed ) | xCarol → • • • • •
```

Because such a sequence of transitions is intrinsically transactional, we may naturally encode the sequence on a blockchain as is illustrated in FIG. 4. As the labeled transition system of this contract is cyclic, the blockchain record of execution, in principle, goes on forever. Each record in this chronicle will be related to every other record via the syntax and semantics of the contract itself. In other words, the contract schematizes the relationships. It is those relationships, rather than the data itself, that frames the audit trail.

As already mentioned, just in time contracts (JITCs) are built around the SAX construct, indicated by "⋈". The SAX construct should be understood as a kind of transactive message forwarder where two or more messages (e.g., message 510 and message 520) are "simultaneously" received from their respective origins and re-sent in parallel to their respective destinations. This construct is presented graphically in FIG. 5, which is a sequence 500 that illustrates the symmetric asset exchange as message forwarding. While the SAX construct was originally conceived to enable synchronous message sending in a fundamentally asynchronous process calculus, "⋈" has additional useful properties. Most particularly, it serves as a basis for the ledger-equivalent of a transaction monitor in a relational database.

FIG. 6 is an example sequence 600 symmetric asset exchanges among Alice, Carol, and Ted as parties to the contract following the example above. FIG. 6 shows the (cycle of) symmetric asset exchanges, occurring in Ted's chronic treatment, with each pair of arrows constituting an exchange. For example, the pair of arrows includes arrows 610(1) and 610(2), 630(1) and 630(2), and 630(1) and 630(2). Such exchanges may be regarded as completed transactions relevant to digital contracts and particularly, on the network slicing and MEC as described herein.

Apparent in both FIGS. 5 and 6 above is that the contract parties emerge as vertical columns and that the exchanges between them are evidenced as (vertical) sequences of pairs of arrows. The sequences of arrows are formally defined as session sequences. A party, in turn, is formally defined as a cascade of clauses. Session sequences, in fact, constitute a kind of interface between pairs of parties. As it happens, part of the formal semantics of contracts is a mathematical construction called simulation by which it is possible to determine if an arbitrary process adheres to an interface. Indeed, as long as a computation correctly simulates an interface, we are completely indifferent to whatever else that computation may be doing. Said another way, JITCs call out how parties must interact. Parties may be doing other things "behind" the interface.

Accordingly, we have presented Alice, Carol, and Ted as if they were interacting directly via messages chronicled on a distributed ledger. Much more likely, their respective computational agents are interacting on their behalf. A more realistic account of what might actually be happening is that Alice, a physician employed by the Oregon Health Sciences University, has her clinical practices orchestrated by OHSU's Epic system. Carol, an insurance claims processor for Aetna, is guided through the claims process by Aetna's installation of BizTalk Server. Finally, Ted interacts with Alice via his MyChart iPhone patient app and with Carol via his Aetna insured app.

Figure 7:
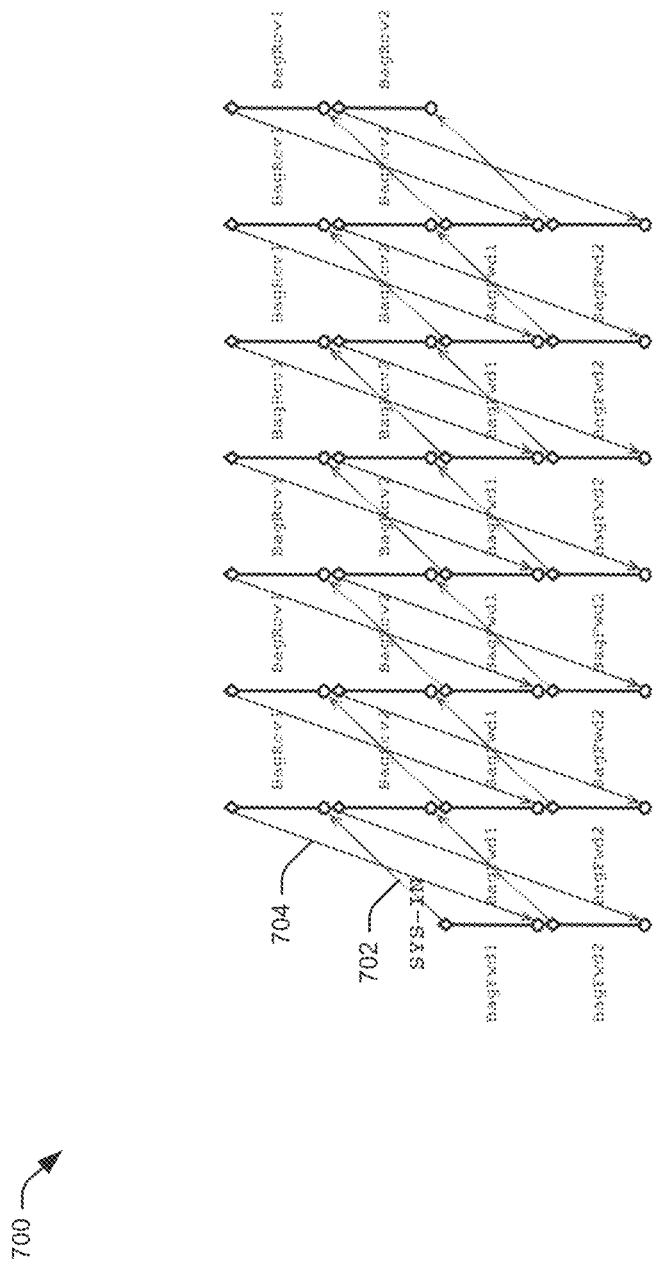
FIG. 7 illustrates example symmetric asset exchanges of baggage forwarding 700 that can be used as a reference for a delivery of messages in an end-to-end network routing path.

SAX of Baggage Forwarding as a Reference for a Consistent View of Network Forwarding Paths in 5G Networks FIG. 7 depicts example symmetric asset exchanges using a baggage flow scenario as a non-limiting illustration of concepts described herein. In FIG. 7, a baggage forwarding flow 700 can be used as a reference for the transmission of data packets over an end-to-end network routing path. FIG. 7 depicts flow of baggage from a starting point to a delivery point. The International Air Transport Association (IATA), one of the oldest, continuously operational, international consortia of commercial interests, may provide the legal and technical governance enabling airline passenger baggage to move around the world. The IATA gets this done in spite of the disparate and sometimes outright conflicting interests of its members. In one example, a BagContract asset exchange contract is a formalization of that which was mandated for IATA members in 2013. In effect, this contract specifies a channel for moving the passenger's bag from end-to-end. The channel may represent an assembly of resources that resembles the autonomous systems as described herein. Moreover, the contract may specify how these autonomous systems or resources may be choreographed so as to move the bag along the path. This specification is both prescriptive and descriptive. It specifies how the parties are to interact. It also provides a computational model against which one can check (via distributed ledger means) for step-by-step contract compliance In one example, the contract may impose upon IATA members the following: 1) demonstrate delivery of baggage when custody changes; 2) demonstrate acquisition of baggage when custody changes; 3) provide an inventory of bags upon departure of a flight; and 4) be capable of exchanging the above information—regarding the delivery and acquisition of the baggage when custody changes—with other members or their agents as needed.

In one embodiment, the distributed SDN manager 134 may formalize a baggage delivery contract as a digital asset exchange contract. In so doing, the SDN manager 134 operationalizes compliance with the IATA Resolution 753. This method of expressing baggage delivery contracts may be selected because of SDN's ability to "run" such contracts and mathematically determine truths about such runs. In this embodiment, the contract may be treated as a formalization of the interactive behavior of a collection of agents modeled as messages passing among them. In reducing behavior to message passing, we implicitly assume the existence of a network fabric over which messages are to be passed. The contract may include two assumptions: that the baggage delivery plan is known apriori in its entirety, and that the network fabric over which baggage moves is immune to errors.

In one example, the IATA members and/or agents who are parties to the contract are AA, EWR, LAX, ORD, and UA. There is a notional agent, SYS, which can be thought of as the operational boundary within which the contract is performed. We identify baggage acceptance and injection as that event marking the passenger's bag making an inbound crossing of that boundary. Symmetrically, we identify baggage return and ejection as the event marking the outbound crossing of the same boundary.

We then imagine a simplified baggage delivery plan, $LAX\text{-}45 :: AA\text{-}163 ::$ $ORD\text{-}K11 :: ORD\text{-}B6 :: UA\text{-}298 :: EWR\text{-}C99 :: []$ which is a list data structure representing the baggage being accepted from the passenger, commended initially to the custody of LAX (gate 45), from which it is, in turn, commended to the custodies of AA (flight 163), ORD (gate K11), ORD (gate B6), UA (flight 298), EWR (gate C99) and back to the passenger. We understand each of the previous elements as being notionally agents. We omit the agent SYS from the plan which we understand to be a cycle originating and terminating at SYS. The baggage contract is defined to be a parallel composition of endpoint cascades and sequessions, BagContract(bag)<=(new inject-bagfwdout, inject-bagchitin, inject-bagcustout, inject-bagrcptin, lax-45-bagchitout, lax-45-bagfwdin, lax-45-bagrcptout, lax-45-bagcustin, lax-45-bagfwdout, lax-45-bagchitin, lax-45-bagcustout, lax-45- bagrcptin, aa-163-bagchitout, aa-163-bagfwdin, aa-163-bagrcptout, aa-163-bagcustin, aa-163-bagfwdout, aa-163-bagchitin, aa-163-bagcustout, aa-163-bagrcptin, ord-k11-bagchitout, ord-k11-bagfwdin, ord-k11-bagrcptout, ord-k11-bagcustin, ord-k11-bagfwdout, ord-k11-bagchitin, ord-k11-bagcustout, ord-k11-bagrcptin, ord-b6-bagchitout, ord-b6-bagfwdin, ord-b6-bagrcptout, ord-b6-bagcustin, ord-b6-bagfwdout, ord-b6-bagchitin, ord-b6-bagcustout, ord-b6-bagrcptin, ua-298-bagchitout, ua-298-bagfwdin, ua-298-bagrcptout, ua-298-bagcustin, ua-298-bagfwdout, ua-298-bagchitin, ua-298-bagcustout, ua-298-bagrcptin, ewr-c99-bagchitout, ewr-c99-bagfwdin, ewr-c99-bagrcptout, ewr-c99-bagcustin, ewr-c99-bagfwdout, ewr-c99-bagchitin, ewr-c99-bagcustout, ewr-c99-bagrcptin, eject-bagchitout, eject-bagfwdin, eject-bagrcptout, eject-bagcustin)

The expression BagContract(bag)<= . . . is assigning the process expression on the right side of the arrow to the name on the left hand side. The semantics of process calculus are such that when the name is "invoked," the process expression is "run." BagContract(bag) declares that there is a single free name, bag, in the body of BagContract. The idea is to supply the bag at the time the contract is run. A pervasive subtlety of process calculi, in general, is that process expressions and process states are the same thing. Thus, the right-hand side of the arrow is not only a process to be run but also the initial state of that process. The first thing we see in the body of BagContract is a declaration of "fresh" names. The sense in which they are fresh is that they are known in no other process instance. They are, in effect, secret and usable in no other context. The declaration of fresh names is also a commitment of resources.

For example, the names aa-163-bagchitout, aa-163-bagfwdin, aa-163-bagrcptout, aa-163-bagcustin, aa-163-bagfwdout, aa-163-bagchitin, aa-163-bagcustout, aa-163-bagrcptin. These names are, in fact, used by no party other than AA-163. This may represent an important design pattern in the overall asynchronous π-calculus with joint inputs. A syntactical enforcement is actually implemented of this pattern in the sublanguage of just-in-time contracts. In many respects the baggage contract and TCP/IP would appear to be quite similar in their objectives: to forward an asset from origin to destination by daisy-chaining a sequence of independent agents. An important difference, however, is apparent in the treatment of errors. Each of the interactions of pairs of parties in BagContract has an "acceptance" phase in which the bag changes custody and a "release" phase in which the forwarding custodian grants permission to the accepting custodian to forward the bag. This would appear to be somewhat redundant. The focus of the baggage contract—unlike TCP, say—is not error correction. Rather, it is error identification and the assignment of culpability. Narrowing the scope of culpability is provably enhanced by the 2-phase approach.

Apparent in FIG. 7 is that the contract parties emerge as vertical columns and that the exchanges between them are evidenced as vertical sequences of pairs of green arrows 702 and red arrows 704. The sequences of arrows are formally defined as session sequences. A party, in turn, can be defined as a cascade of clauses. Session sequences may include a kind of interface between pairs of parties. Part of the formal semantics of contracts is a mathematical construction called simulation by which it is possible to determine if an arbitrary process adheres to an interface.

In one embodiment, the asset exchange contracts for the baggage forwarding may be chronicled on the HLF. Applying to the transmission of data packets, the transmission of data packets may be chronicled on the HLF to generate the temporal audit trail that can be used to confirm the service level via the distributed ledgers. These asset exchange contracts may govern the behaviors of autonomous systems allowing them to query and update the consensus global state of routing.

SAX of Credit Card Clearance as a Reference for a Mobile Network Hosted Service

Figure 8:
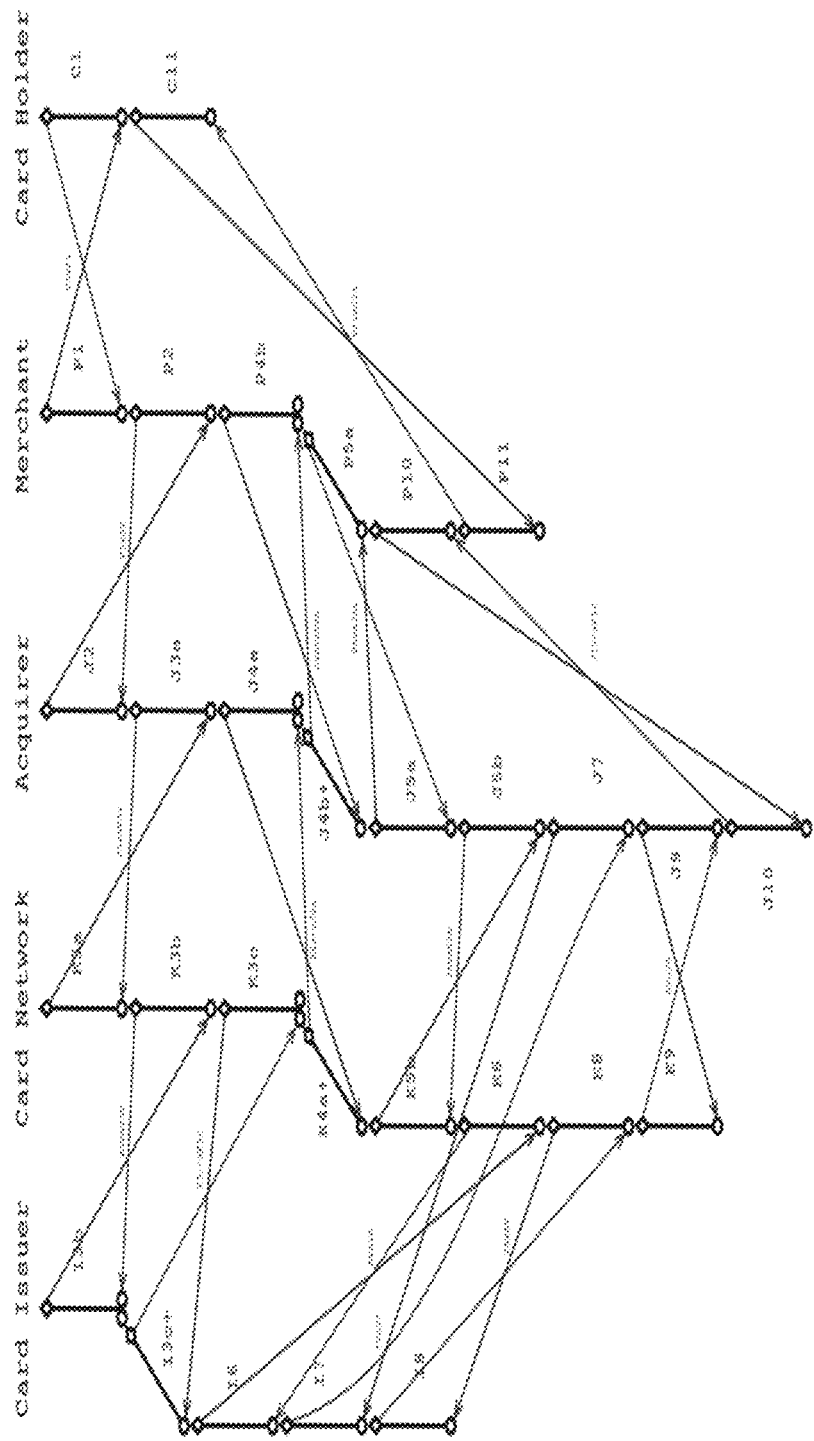
FIG. 8 illustrates example symmetric asset exchanges of credit card clearance 800 that can be used as a reference for a mobile network hosted service.

FIG. 8 depicts example symmetric asset exchanges of credit card clearance 800 that can be used as a reference for the mobile network hosted service. 5G network slicing may allow the MNOs to offer a secure virtual subnetwork to carry credit card transactions. In this scenario, gasoline pumps, vending machines, and parking garage gates are just more "things" on the Internet of Things and, thus, potential points of sale. Edge computing is another aspect of 5G technology that has a potential role in credit card transactions. On the assumption that the clearinghouses are hosted on distributed ledger technology, and the advent of distributed ledgers operating on edge compute nodes, it makes sense to move automated clearing houses (ACHs) to the edge and nearer the source of transactions.

In one example, the parties to the credit card transaction includes cardholder (C), merchant (P), card issuer (I), acquirer (J), mobile wallet (M), and mobile operator (W). Undertaking the performance of a contract may depend upon the successful completion of the performance of other contracts. In one example, the interaction amount the parties of the wireless-mediated credit card transaction are as follows:

```
-- C1 x M1
    C1(tout,AK,qin) <=
        (new t0)tout!<t0,AK> | qin?(q)stop
    M1(qout,tin) <=
        (new q0)qout!<q0> | tin?(t,ak)stop
M exchanges a transaction request, an ID and a CCC with W for a
promise to transactthe credit card purchase
    -- M2 x W1
    M2(tout',t,ID,CCC,qin') <=
        tout'!<t,ID,CCC> | qin'?(q')stop
    W1(qout',tin') <=
        (new q1)qout'!<q1> | tin'?(t',ci,cc)stop
W exchanges an extensible authentication protocol (EAP) session identifier EID
with
    P for a transaction noticed token which authorizes the transfer of
    goods/services
    -- W2 x P1
    W2(eout,nin) <=
        (new e0)eout!<e0> | nin?(n)stop
    P1(nout,ein) <=
```

-continued

```
        (new n0)nout!<n0> | ein?(e)stop
    W exchanges t', cc and a n0 with I for a promise to pay J, K and M
        -- W3 x I1
        W3(tout",t',cc,n0,qin") <=
            tout" !<t',cc,n0> | qin"?(q")stop
            I1(qout",tin") <=
                (new q2)qout"!<q2> | tin"?(t",ci',cc')stop
I exchanges a payment for the cost of goods/service with J for a receipt for the cost of
goods/services
        -- I2 x J1
        I2(pout,rin) <=
            (new p0)pout!<p0> | rin?(r)stop
        J1(rout,pin) <=
            (new r0)rout!<r0> | pin?(p)stop
I exchanges a card network interchange fee with K for a receipt for the card
networkinterchange fee
        -- I3 x K1
        I3(pout',rin') <=
            (new p1)pout'!<p1> | rin'?(r)stop
        K1(rout',pin') <=
            (new r1)rout'!<r1> | pin'?(p)stop
I exchanges C's wallet transaction fee with M for a receipt for a wallet transaction fee
        -- I4 x M3
        I4(pout",rin") <=
            (new p2)pout"!<p2> | rin"?(r")stop
        M3(rout",pin") <=
            (new r2)rout"!<r2> | pin"?(p")stop
j exchanges an acquirer network interchange fee with K for a receipt for
the acquirer network interchange fee
        -- J2 x K2
        J2(pout"',rin"') <=
            (new p3)pout"'!<p3> | rin"'?(r"')stop
        K2(rout"',pin"') <=
            (new r3)rour"'!<r3> | pin"'?(p"')stop
M exchanges an wallet interchange fee with K for a receipt for the wallet
interchangefee
        -- M4 x K3
        M4('pout,'rin) <=
(new p4)'pout!<p4> | 'rin?(r)stop
        K3('rout,'pin) <=
            (new
        r4)'rout!<r4> |
            'pin?('p)stop
The complete contract is
MWContract(AK,ID,CCC) <=
        (new tout,qin, qout,tin,tout',qin',rout",pin",'pout,'rin,
            qout",tin",pout,rin,pout',rin',pout",rin",
            qout',tin',eout,nin,tout",n0,qin",
            rout,ein, rout,pin,pout"',rin"',
            rout',pin',rout"',pin"','rout,'pin)
        C1(tout,AK,qin) |
            -- C1 x M1
            (tout,qout)./(qin,tin) |
        M1(qout,tin)M2(tout',t,ID,CCC,qin')
            M3(rout",pin")M4('pout,'rin) |
            -- M2 x W1 ; M3x I4 ; M4 x K3
            (tout',qout')./(qin',tin')
                (rout",pout")./(pin",rin")
                    ('pout,'rout)./('rin,'pin) |
        I1(qout",tin")I2(pout,rin)
            I3(pout',rin')I4(pout",rin") |
            -- I2 x J1; I3 x K1
            (pout,rout)./(rin,pin)(pout',rout')./(rin',pin') |
        W1(qout',tin')W2(eout,nin)W3 (tout",t',cc,n0,qin") |
            -- W2 x P1; W3 x I1
            (eout,nout)./(nin,ein)(tout",qout'
        ')./(qin",tin") | P1(rout,ein) |
        J1(rout,pin)JJ2(pout"',rin"') |
            -- J2 x K2
(pout"',rout"')./(rin"',pin"') |
K1(rout',pin')K2(rout"',pin"')K3('rout,'pin)
```

In one embodiment, the asset exchange contract as depicted in FIG. 8 may be similarly applied in networks for a consistent view of network forwarding paths.

Network Peering Contract

Figure 9:
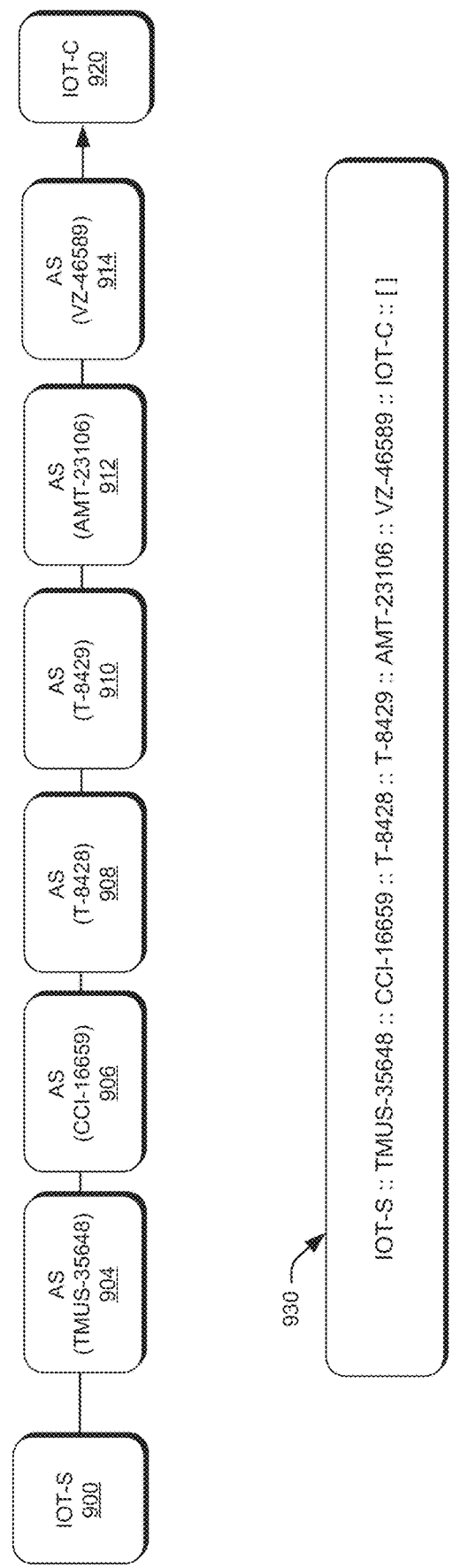
FIG. 9 illustrates an example optical path for an orchestrated end-to-end optical fiber connection.

FIG. 9 depicts an optical path for an orchestrated end-to-end optical fiber connection. A network service may be orchestrated for automated services across the traditional and virtualized network. The orchestrating may include adding, changing, and deleting services without disrupting overall service, and help ensure that services are delivered in real-time. In one embodiment, the end-to-end optical fiber connection, which includes multiple resources of multiple network providers, may be orchestrated such that an IoT sensor device (IOT-S) 900 may establish a connection with a model-based controller (IOT-C) 920 whose accuracy and precision are governed by both bandwidth and latency of available sensor data. In one example, an intermediate path between the IOT-S 900 and the IOT-C 920 may include autonomous systems 902-914. Each of the autonomous systems 902-914 may include a 5G MNO that may be willing to lend capacity to a just-in-time "leased line" service. Consequently, a model 920 may represent the path between the IOT-S 900 and the IOT-C 920. This path not only reflects the connecting between the IOT-S 900 to IOT-C 920 but can also represent a peering of network providers. This peering plan may be compared to the symmetric asset exchanges of baggage plan as described above.

In a particular embodiment, a similar approach may be taken to the orchestration of the end-to-end fiber connection between the IOT-S 900 to IOT-C 920. In one example, a fiber path contract may be constructed to be analogous to the baggage contract by defining two primitive endpoint clauses:

```
MsgRcv(ackout,msgin) <=
    (new ack)ackout!<ack> | msgin?(m)stop and
MsgSnd(msg,msgout,ack <= msgout!<msg> |
    ackin?(a)stop
We cascade the clauses into a subcontract
Link(ackout,msgin,msgout,ackin)<=
    MsgRcv(ackout,msgin)MsgSnd(m,msgout,
    ackin)
```

Now, we can proceed in our established pattern, emphasizing the decidedly repetitive nature of the required contract:

```
ChnlContract(iot-s-msgout,iot-s-ackin,
                                            35648-ackout,35648-
                    msgin,35648-msgout,35648-ackin. 16659-ackout,16659-
                        msgin,16659-msgout,16659-ackin, 8428-ackout,8428-
                                                            msgin,8428-
                                                      msgout,8428-ackin,
                        8429-ackout,8429-msgin,8429-
                        msgout,8429-ackin, 23106-
                        ackout,23106-msgin,23106-
                        msgout,23106-ackin, 46589-
                        ackout,46589-msgin,46589-
                        msgout,46589-ackin
                        ) <=
            (new iot-s-msgout,iot-s-ackin,
            iot-c-ackout,iot-c-msgin)
            ChnlContract*(iot-s-msgout,iot-
            s-ackin,
35648-ackout,35648-msgin,35648-msgout,35648-ackin.
                        16659-ackout,16659-
                        msgin,16659-msgout,16659-
                        ackin, 8428-ackout,8428-
                        msgin,8428-msgout,8428-ackin,
                        8429-ackout,8429-msgin,8429-
                        msgout,8429-ackin, 23106-
                        ackout,23106-msgin,23106-
                        msgout,23106-ackin,
                        46589-ackout,46589-msgin,46589-msgout,46589-
                        ackin, iot-c-ackout,iot-c- msgin)*
            ChnlContract*(iot-s-msgout,iot-s-ackin,
                        35648-ackout,35648-
                        msgin,35648-msgout,35648-
                        ackin. 16659-ackout,16659-
                        msgin,16659-msgout,16659-
                        ackin, 8428-ackout,8428-
                        msgin,8428-msgout,8428-ackin,
                        8429-ackout,8429-msgin,8429-
                        msgout,8429-ackin, 23106-
                        ackout,23106-msgin,23106-
                        msgout,23106-ackin,
                        46589-ackout,46589-msgin,46589-msgout,46589-
                        ackin, iot-c-ackout,iot-c- msgin) <=
            -- IOT-S
            (new msg)MsgSnd(msg,iot-s-msgout,iot-s-ackin) |
                -- IOT-S x TMUS-35648
                (iot-s-msgout,35648-ackout)./(iot-s-ackin,35648-msgin) |
            -- TMUS-35648
            Link(35648-
                        ackout,356
                        48-msgin,
                        35648-
                        msgout,356
                        48-ackin) |
                -- TMUS-35648 x CCI-16659
                (35648-msgout,-16659-ackout)./(35648-ackin,16659-msgin) |
            -- CCI-16659
            Link(16659-
                        ackout,166
                        59-msgin,
                        16659-
```

```
                msgout,166
                59-ackin) |
        -- CC1-16659 x T-8438
            (16659-msgout,8428-ackout)./(16659-ackin,8428-msgin) |
    -- T-8428
    Link(8428-
                ackout,84
                28-
                msgin,
                8428-
                msgout,8
                428-
                ackin) |
        -- T-8438 x T-8429
            (8428-msgout,8429-ackout)./(8428-ackin,8429-msgin) |
    -- T-8429
    Link(8429-
                ackout,84
                29-
                msgin,
                8429-
                msgout,8
                429-
                ackin) |
        -- T-8439 x AMT-23106
            (8429-msgout,23106-ackout)./(8429-ackin,23106-msgin) |
    -- AMT-23106
    Link(23106-
                ackout,231
                06-msgin,
                23106-
                msgout,231
                06-ackin) |
        -- AMT-23106 x VZ-46589
            (23106-
                msgout,46
                589-
                ackout)./
                (23106-
                ackin,4658
                9-msgin) |
    -- VZ-46589
    Link(46589-
                ackout,465
                89-msgin,
                46589-
                msgout,465
                89-ackin) |
        -- VZ-46589 x IOT-C
            (VZ-46589-
                msgout,iot-
                c-ackout)./
                (46589-
                ackin,jot-c-
                msgin) |
    -- IOT-C
MsgRcv(iot-c-ackout,iot-c-msgin)ChnlContract.
```

In one embodiment, the above contract may indicate what resources or autonomous systems 902-914 the various parties can allocate to maintain the fiber path between the IOT-S 900 and the IOT-C 920. It is intended that those resources be allocated outside the scope of ChnlContract. The contract then specifies the interactions of the parties to maintain the path. As usual, since the contract may be run, the contract also models the dynamic behavior of the parties. The last thing that the ChnlContract subcontract does is to call itself. The recursion may reflect that the fiber path between the IOT-S 900 and the IOT-C 920 is meant to be persistent.

One of the main applications of process calculi is the modeling of hardware at various levels of detail. In such settings, both as a deadline and as a duration are an important aspect of modeling. Such techniques may amount to prefixing the processes of some atemporal calculus with temporal "guards." The guards of the deadline may be simple time delays. The guards of the duration are complex systems of temporal constraints. Applying simple delay guards to the ChnlContract, we would prefix each of the parties' subcontracts with a time delay, indicating the transit time across that party's domain. For example, (u-sec 500)Link(16659-ackout, 16659-msgin, 16659-msgout, 16659-ackin)

would indicate a delay of 500 microseconds in traversing the autonomous system 906 with number 16659.

In their role as descriptions of behavior, we have shown how contract performance can be chronicled on the distributed ledger. As it happens, HLF is equipped with elaborate machinery for timestamping transactions on its blockchain. Thus, we can track when transitions occur between autonomous systems, leaving a temporal audit trail. Combined with the above described temporal enhancement of contracts, we can check the level of service actually provided against the level of service prescribed by the contract.

In one example, the label switching history (LSH) may be recorded on the distributed ledger. Such histories can accumulate the complete history of a packet through the network, including metadata such as timestamps. One of the things pointed out in the LSHs is that an LSH, being a tree structure, can be "pruned" in various ways. For example, one pruning includes restricting the history to label switching routers appearing in the higher strata of a hierarchy of such routers. The routers connecting the autonomous systems above would certainly be such. Another way to prune LSHs is by the labels themselves. Since the label switching paradigm offers immense flexibility as to what the available labels are, one can easily imagine a label or family of labels intended solely for use in the fiber path above. In addition to other auditing data on the blockchain, a custom label LSH may provide a channel-specific "fingerprint" for packets transiting the fiber path.

Contract as a Service

Providers of the 5G communications fabric may include use cases calling for a distributed ledger substrate with contracts performed thereupon. For HLF distributed ledgers, the existence of peers running in VMs may be assumed. This assumption fits naturally with the edge computing model. Earlier, the peering contract was presented as if it were a high-level agreement made among the peers collectively. While this is certainly consistent with historical telco practice, there are still developments that can be made. For example, a $3^{rd}$ party provider may arrange with individual autonomous systems to provide the fiber "easements." With such easements on hand, the $3^{rd}$ party (or hereinafter referred to as the "jobber") may spin up the end-to-end path.

While the occurrences of Link in ChnlContract appear to be composed in parallel, the semantics of "./" is such that those occurrences can run only in their presented lexical order. Even more strongly, were we to drop the first instance of Link, absolutely nothing would happen. The bottom line is that we can separate the launching of the occurrences of Link from launching the remainder of the contract. Now we posit each autonomous system offers an "easement web service" party (to a fiber path orchestration contract), the main effect of which is to spin up instances of Link. For TMUS-35648 that service is

```
    ES(35648-nmsout,35648-rqnmsin) <= (new ackout,msgin,
msgout,ackin)
        35648-
            nmsout!<ackout,msgi
            n,msgout,ackin> |
            35648-rqnmsin?(rqn)
            (Link*(ackout,msgin,
            msgout,ackin) |
                ES(35648-rplout,35648-rqstin))
    where
    Link*(ackout,ms
        gin,msgout,ack
        in) <=
        Link(ackout,m
        sgin,msgout,ac
        kin)
Link*(ackout,msgin,msgout,ackin)
```

As our contract model disallows direct communication between parties, we also need a corresponding session sequence to enable the jobber to engage the web service:

```
        JBxES(35648-rqnmsout,35648-mnsout
        35648-nmsin,35648-rqnmsin) <=
    ((35648-rqmnsout,35648-nmsout)./
        (35648-nmsin,35648-rqnmsin))
        JBxES(35648-rqnmsout,35648-nmsout,
            35648-nmsin,35648-rqnmsin)
```

ES exchanges a name request for the quadruple of names bound in the instance of Link which it launches, making itself ready for additional requests. For future reference, the interaction with the web service happens solely by virtue of knowing the port names, 35648-rqnmsout and 35648-nmsin. Put another way, JBxES with different free names constitutes a session sequence with a different web service. At this point, we have in hand the design pattern for soliciting a Link from an autonomous system's easement web service. Indeed, a service instance of such a web service is understood to be a Link. Links in ChnlContract are chained together by sessions sequences. Consequently, we need a second web service from which we can manufacture such seqsessions

```
SS(ackout,xnmsin) <=
    (new ack)ackout!<ack> |
    xnmsin(n1,n2,n3,n4)
                *
    ((n1,n2)./(n3,n4) | SS(ackout,xnmsin)) where
                *
(n1out,n2out)./(n2in,n2in) <=
(n1out,n2out)./(n2in,n2in)
                *
    (n1out,n2out)./(n2in,n2in)
```

The SS web service requires a session sequence by which it can be accessed

```
JBxSS(xnmsout,ackout,ackin,xnmsin) <=
    (xnmsout,ackout)./(ackin,xnmsin)
    JBxSS(xnmsout,ackout,ackin,xnmsin)
```

Now we turn to the task of specifying a jobber that can spin up a chain of session sequenced Links. In one example, the directive(s) should be given to the jobber to guide its work includes;

$$IOT\text{-}S :: TMUS\text{-}35648 :: CCI\text{-}16659 :: T\text{-}8428 :: T\text{-}8429 ::$$
$$AMT\text{-}23106 :: VZ\text{-}46589 :: IOT\text{-}C :: [\,]$$

would appear to be a candidate. As already noted, the endpoints IOT-S 900 and IOT-C 920 are not, properly speaking, part of the fiber path. Also, the jobber is unlikely to know about autonomous systems such as TMUS-35648 (block 904 of FIG. 9). On the other hand, it does know about the autonomous system's web services represented by port pairs such as 35648-rqnmsout and 35648-nmsin. An appropriate directive therefore may include an orchestration plan

```
(35648-rqnmsout,35648-nmsin) : :
    (16659-rqnmsout,16659-nmsin) : : (8428-
        rqnmsout,8428-nmsin : : (8429-
            rqnmsout,8429-nmsin : :
                (23106-rqnmsout,23106-nmsin) : :
(46589-rqnmsout,46589-nmsin) : : [ ]
``` which has an obvious correspondence with the previous list. The jobber will also need the ports corresponding to IOT-S 900 and IOT-C 920 and, therefore, two additional parameters, (iot-s-msgout, iot-s-ackin) and (iot-c-ackout, iot-c-msgin). For each of the n web services mentioned on an orchestration plan, it will be the job of the jobber to create n Link*s and n+1 session sequences. n−1 of the session sequences are "normal" in that they connect two Link*s. There are two "extremal" cases, one connecting IOT-S to a Link*, other connecting a Link* to IOT-C. We present the jobber as a contract

```
J(iot-s-out,iot-s-in,op,iot-c-out,iot-c-in) <=
    (new opout,rin,csout,opin'nmsout,lcsin
        rout,opin,opout',csin, xnmsout,ackin,
        nackout,nmsin,xnmsout,ackin)
    JC(opout,op,rin, csout,iot-s-out,iot-s-in,opin',
        nnmsout,iot-c-out,iot-c-in,lcsin) |
    JCxJX(opout,rout,rin,opin,
            csout,opout',opin',csin,
            nnmsout,lcsout,lcsin,nmsin) |
    JX(rout,opin,opout',csin, xnmsout,ackin,
        nackout,nmsin,xnmsout,ackin)
    where
    JC(opout,op,rin, csout,lcout,lcin,opin',
        nnmsout,rcout,rcin,lcsin) <=
    JC1(opout,op,rin)JC2(csout,lcout,lcin,opin')
        JC3(nnmsout,rcout,rcin,lcsin,op')
            (stop,
            JC(✓,op',✓,✓,lcin",lcout",✓,✓,✓,✓))
    JX(rout,opin, opout',csin, xnmsout,ackin,
        nackout,nmsin,xnmsout,ackin) <=
    JX1(rout,opin)JX2(opout',ops,csin)JX4(cout,cin)
        JX5(xnmsout,lcin',lcout',aout,min,ackin)
        JX3(nackout,mnsin,ops)
            JX6(xnmsout,lcin',lcout',aout,min,ackin)
            (stop, JX(✓,✓,✓,✓,
                ✓,✓,
                ✓,✓,✓,✓))
    JCxJX(opout,rout,rin,opin, csout,opout',opin',csin,
```

-continued

```
             nnmsout,lcsout,lcsin,nmsin) <=
         (opout,rout)./(rin,opin) (csout,opout')./(opin',csin)
             (if art2 = [ ] then (nnmsout,lcsout)./(lcsin,nmsin)
                                         else
                                     (nnmsout,lcsout)./(l
                                     csin,nmsin)
                                     JCxJX(✓,✓,✓,✓,
                                         ✓,✓,✓,✓,✓,✓,✓))
and where JC and JX exchange the orchestration plan for a receipt,
             JC1(opout,op,rin) <= opout!<op> | rin?(r)stop
             JX1(rout,opin) <=
                 (new r0)rout!<r0> | opin?((cout,cin):ops)stop
JC and JX exchange a pair of left side SAX ports for the
continuation of theorchestration plan,
             JC2(csout,lcout,lcin,opin') <= csout!<lcout,lcin> !
             opin'?(op')stop
             JX2(opout',ops,csin) <=opout'!<ops> |
             csin?(lcin',lcout')stop
JX and a Link* producing web service exchange exchange a names
request for aquadruple of Link* ports,
             JX4(cout,cin) <= (newrqn0) cout!<rqn0> |
                 cin?(aout,min,mout, ain)stop
    *                                                            *
JX and the ./ producing SS web service exchange a quadruple of
./ ports for anacknowledgment,
JX5(xnmsout,lcin',lcout',aout,min,ackin)<=
xnmsout!<lcin',lcout',aout,min> | ackin?(a)stop
JC and a JX loop until they've covered every web service in the
orchestration plan,
             JC3(nnmsout,rcout,rcin,lcsin,op') <=
                 nnmsout!<rcout,rcin> | lcsin?(lcin",lcout")if op'
                 = [ ] then stop
                             else stop
             JX3(lcsout,nmsin,ops) lcsout!<mout,ain> |
                 nmsin?(rcin',rcout')if ops = [ ] then stop else stop
                                     * and JX finishes by
                                     invoking the ./ producing
                                     SS
             web service to connect IOT-S to the choreography.
JX6(xnmsout,lcin',lcout',aout,min,ackin) <= xnmsout!<lcin',lcout',aout,min> |
ackin?(a)stop
```

The contract J may be understood as an orchestration of web service engagements which, in turn, produces a choreography of web service instances. The latter choreography is just a symmetric asset exchange contract. While not identical to the contract, ChnlContract, it is bisimilar to it.

Example Implementation of Confirming Service Levels Via Distributed Ledgers

Figure 10:
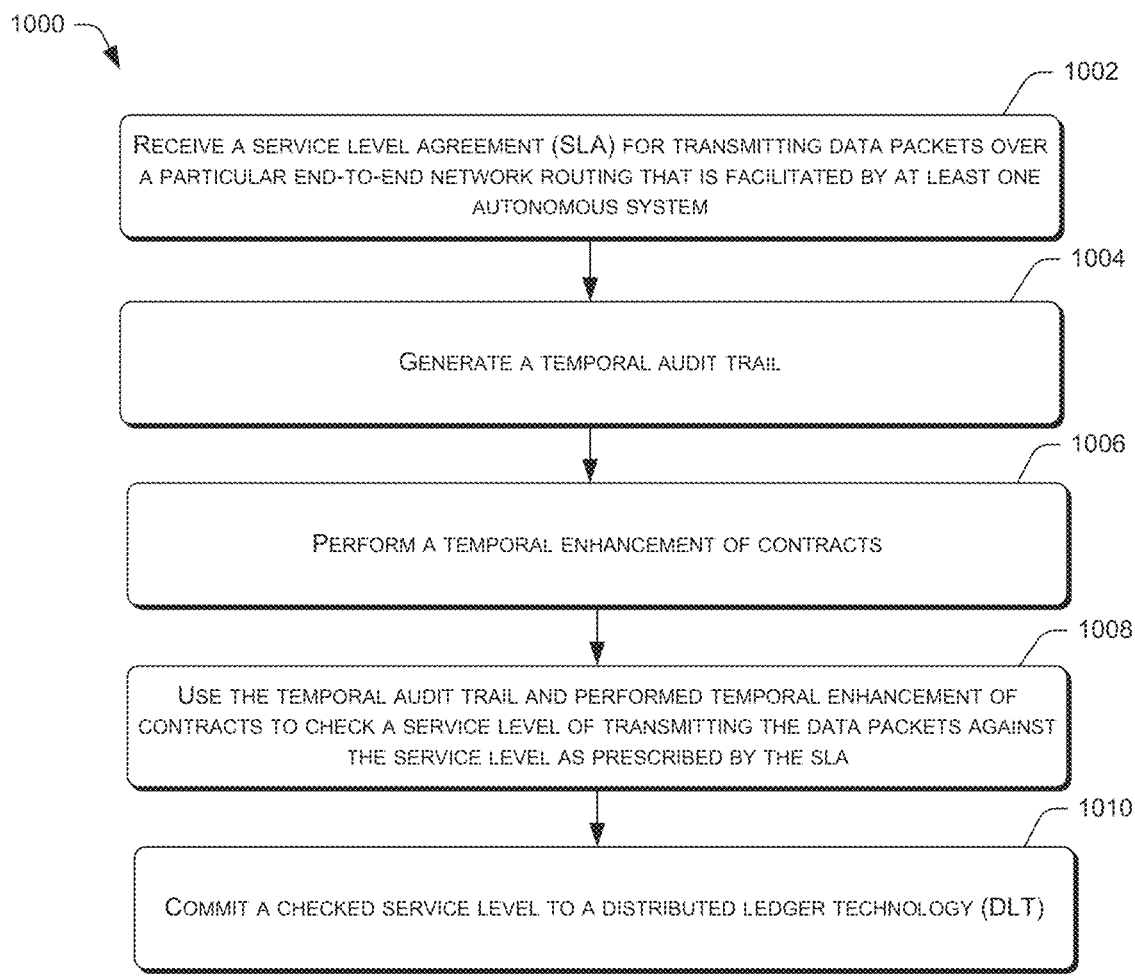
FIG. 10 illustrates a methodological implementation of a technique for confirming the service level via the distributed ledgers.

FIG. 10 is a flow diagram 1000 that depicts a methodological implementation of a technique for confirming service levels via distributed ledgers. In the following discussion of FIG. 10, continuing reference is made to the elements and reference numerals shown in and described with respect to the SDN managers in FIG. 1. Further, certain operations may be ascribed to particular system elements shown in previous figures. However, alternative implementations may execute certain operations in conjunction with or wholly within a different element or component of the system(s). To the extent that certain operations are described in a particular order, it is noted that some operations may be implemented in a different order to produce similar results.

At block 1002, the distributed SDN managers and particularly, the network scheduler 144, may receive an SLA for transmitting data packets over a particular end-to-end network routing that is facilitated by at least one autonomous system. For example, the IOT-S 900 may utilize a network path that includes the autonomous systems 904-912. In this example, the IOT-S 900 may be associated with an SLA for using the path to transmit data packets. The SLA may include a volume of data packets to route or transmit, a minimum level of QoS, and a time window for the transmission of the data packets.

At block 1004, the network scheduler 144 may generate a temporal audit trail. In one example, the DLT may include the HLF with the blockchain. In this example, the HLF timestamps the transactions on the blockchain to track the transitions between autonomous systems and leave the temporal audit trail. The HLF may be based at least upon an asset exchange contract performance and provide shared storage for applications.

At block 1006, the network scheduler 144 may perform temporal enhancement of contracts. In one example, the temporal enhancement of contracts may include the choreographing of the autonomous systems 904-912. Choreography is a symmetric asset exchange, and the choreographing may be based upon symmetric asset exchanges of baggage forwarding and/or credit card payments. In some examples, the symmetric asset exchanges of baggage forwarding may include formalizing a delivery contract as the digital asset exchange contract.

At block 1008, the network scheduler 144 may use the generated temporal audit trail and performed temporal enhancement of contracts to check a service level of transmitting the data packets against the service level as prescribed by the SLA. In one example, the generated temporal audit trail and the performed temporal enhancement of contracts may be combined to confirm the actual service level of transmitting the data packets against the service level as prescribed by the contract. In this example, the actual service level may include actual QoS measurements of data packets that are transiting the end-to-end network routing, amount or volume of data packets that transited, and the actual time window during the actual data packet transit.

At block 1010, the network scheduler 144 may commit a checked service level to the DLT. In one example, the DLT may be a central data storage.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more non-transitory computer-readable storage media storing computer-executable instructions that upon execution cause one or more computers to collectively perform acts comprising:
    receiving, at a network scheduler, a service level agreement (SLA) for transmitting data packets over an end-to-end network routing that is facilitated by a plurality of autonomous systems, the SLA prescribing a service level for a transmission between ends of the transmission, wherein the SLA includes a time window for the transmitting;
    tracking transitions between the autonomous systems;
    generating, by the network scheduler, a temporal audit trail of the SLA according to the tracked transitions, wherein the temporal audit trail includes a plurality of timestamped transactions;
    performing, by the network scheduler, a temporal enhancement of the SLA by using an asynchronous process calculus, wherein the temporal enhancement of the SLA includes choreographing the plurality of autonomous systems for the transmission;
    combining the generated temporal audit trail of the SLA and performed temporal enhancement of the SLA to check a service level against the service level prescribed by the SLA, wherein the temporal enhancement of the SLA enables an actual service level including an actual time window during actual data packet transit to be confirmed based on the combining; and
    committing the checked service level to a distributed ledger technology (DLT).

2. The one or more non-transitory computer-readable storage media of claim 1, wherein the SLA includes a volume of data packets to transmit and a minimum level of Quality of Service (QoS).

3. The one or more non-transitory computer-readable storage media of claim 1, wherein the DLT includes a Hyperledger Fabric (HLF) with a blockchain.

4. The one or more non-transitory computer-readable storage media of claim 3, wherein the HLF facilitates timestamping of a transaction on the blockchain to track the transitions between the autonomous systems and leave the temporal audit trail.

5. The one or more non-transitory computer-readable storage media of claim 3, wherein the HLF is based at least upon an asset exchange contract performance.

6. The one or more non-transitory computer-readable storage media of claim 1, wherein the asynchronous process calculus allows a processor to send a message to a node and proceed to a next function without having to wait for a reply from the node.

7. The one or more non-transitory computer-readable storage media of claim 1, wherein the network scheduler provides a corresponding fingerprint for data packets that are transiting the end-to-end network routing.

8. The one or more non-transitory computer-readable storage media of claim 1, wherein a choreography is a symmetric asset exchange.

9. The one or more non-transitory computer-readable storage media of claim 1, wherein the temporal enhancement of the SLA is based upon symmetric asset exchanges of baggage forwarding.

10. The one or more non-transitory computer-readable storage media of claim 9, wherein the symmetric asset exchanges of baggage forwarding includes formalizing a delivery contract as a digital asset exchange contract.

11. A system, comprising:
    one or more processors; and
    memory including a plurality of computer-executable components that are executable by the one or more processors to perform a plurality of actions, the plurality of actions comprising:
    receiving, at a network scheduler, a service level agreement (SLA) for transmitting data packets over a particular end-to-end network routing that is facilitated by a plurality of autonomous systems, the SLA prescribing a service level for a transmission between ends of the transmission, wherein the SLA includes a time window for the transmitting;
    tracking transitions between the autonomous systems;
    generating, by the network scheduler, a temporal audit trail of the SLA according to the tracked transitions, wherein the temporal audit trail includes a plurality of timestamped transactions;
    performing, by the network scheduler, a temporal enhancement of the SLA by using an asynchronous process calculus, wherein the temporal enhancement of the SLA includes choreographing the plurality of autonomous systems for the transmission;
    combining the generated temporal audit trail of the SLA and performed temporal enhancement of the SLA to check a service level against the service level prescribed by the SLA, wherein the temporal enhancement of the SLA enables an actual service level including an actual time window during actual data packet transit to be confirmed based on the combining; and
    committing the checked service level to a distributed ledger technology (DLT).

12. The system of claim 11, wherein the SLA includes a volume of data packets to transmit and a minimum level of Quality of Service (QoS).

13. The system of claim 11, wherein the DLT includes a Hyperledger Fabric (HLF) with a blockchain.

14. The system of claim 13, wherein the HLF facilitates timestamping of a transaction on the blockchain to track the transitions between the autonomous systems and leave the temporal audit trail.

15. The system of claim 13, wherein the HLF is based at least upon an asset exchange contract performance.

16. The system of claim 11, wherein the network scheduler provides a corresponding fingerprint for data packets that are transiting the end-to-end network routing.

17. A computer-implemented method, comprising:
    receiving, at a network scheduler, a service level agreement (SLA) for transmitting data packets over a particular end-to-end network routing that is facilitated by a plurality of autonomous systems, the SLA prescribing a service level for a transmission between ends of the transmission, wherein the SLA includes a time window for the transmitting;

tracking transitions between the autonomous systems;

generating, by the network scheduler, a temporal audit trail of the SLA according to the tracked transitions, wherein the temporal audit trail includes a plurality of timestamped transactions;

performing, by the network scheduler, a temporal enhancement of the SLA by using an asynchronous process calculus, wherein the temporal enhancement of the SLA includes choreographing the plurality of autonomous systems for the transmission;

combining the generated temporal audit trail of the SLA and performed temporal enhancement of the SLA to check a service level against the service level prescribed by the SLA wherein the temporal enhancement of the SLA enables an actual service level including an actual time window during actual data packet transit to be confirmed based on the combining; and committing the checked service level to a distributed ledger technology (DLT).

18. The computer-implemented method of claim 17, wherein the SLA includes a volume of data packets to transmit and a minimum level of Quality of Service (QoS).

19. The computer-implemented method of claim 17, wherein the DLT includes a Hyperledger Fabric (HLF) with a blockchain.

20. The computer-implemented method of claim 19, wherein the HLF facilitates timestamping of a transaction on the blockchain to track the transitions between the autonomous systems and leaving the temporal audit trail.

* * * * *